(12) United States Patent
Tanner et al.

(10) Patent No.: US 12,101,479 B2
(45) Date of Patent: Sep. 24, 2024

(54) CONTENT AND QUALITY ADAPTIVE WAVEFRONT SPLIT FOR PARALLEL VIDEO CODING

(71) Applicant: INTEL CORPORATION, Santa Clara, CA (US)

(72) Inventors: Jason Tanner, Folsom, CA (US); Sergei Plotnikov, Folsom, CA (US); Mark Buxton, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 16/828,650

(22) Filed: Mar. 24, 2020

(65) Prior Publication Data

US 2020/0228801 A1 Jul. 16, 2020

(51) Int. Cl.
| | |
|---|---|
| *H04N 19/55* | (2014.01) |
| *H04N 19/119* | (2014.01) |
| *H04N 19/124* | (2014.01) |
| *H04N 19/14* | (2014.01) |
| *H04N 19/172* | (2014.01) |
| *H04N 19/176* | (2014.01) |

(52) U.S. Cl.
CPC ......... *H04N 19/119* (2014.11); *H04N 19/124* (2014.11); *H04N 19/14* (2014.11); *H04N 19/172* (2014.11); *H04N 19/176* (2014.11)

(58) Field of Classification Search
CPC .... H04N 19/119; H04N 19/124; H04N 19/14; H04N 19/172; H04N 19/176
See application file for complete search history.

(56) References Cited

U.S. PATENT DOCUMENTS

| | | | |
|---|---|---|---|
| 2017/0208335 A1* | 7/2017 | Ramamurthy | ....... H04N 19/156 |
| 2017/0238001 A1* | 8/2017 | Li | .......................... H04N 19/55 |
| | | | 375/240.12 |

* cited by examiner

*Primary Examiner* — Patrick E Demosky
(74) *Attorney, Agent, or Firm* — Essential Patents Group, LLP

(57) ABSTRACT

Techniques related to parallel block video coding using an adaptive wavefront split are discussed. Such techniques include adaptively applying a wavefront split in a video frame based on a frame level quantization parameter of the video frame, an encode duration of a previous frame, and/or image content of the video frame.

21 Claims, 12 Drawing Sheets

FIG. 5

| 0 | 1 | 2 | 3 | 4 | 5 | 6 | 7 | 8 | 9 | 10 |
|---|---|---|---|---|---|---|---|---|---|----|
| 2 | 3 | 4 | 5 | 6 | 7 | 8 | 9 | 10 | 11 | 12 |
| 4 | 5 | 6 | 7 | 8 | 9 | 10 | 11 | 12 | 13 | 14 |
| 6 | 7 | 8 | 9 | 10 | 11 | 12 | 13 | 14 | 15 | 16 |
| 8 | 9 | 10 | 11 | 12 | 13 | 14 | 15 | 16 | 17 | 18 |
| 10 | 11 | 12 | 13 | 14 | 15 | 16 | 17 | 18 | 19 | 20 |
| 12 | 13 | 14 | 15 | 16 | 17 | 18 | 19 | 20 | 21 | 22 |

FIG. 6

| 0 | 1 | 2 | 3 | 4 | 5 | 6 | 7 | 8 | 9 | 10 |
|---|---|---|---|---|---|---|---|---|---|----|
| 2 | 3 | 4 | 5 | 6 | 7 | 8 | 9 | 10 | 0 | 1 |
| 4 | 5 | 6 | 7 | 8 | 9 | 10 | 0 | 1 | 2 | 3 |
| 6 | 7 | 8 | 9 | 10 | 0 | 1 | 2 | 3 | 4 | 5 |
| 8 | 9 | 10 | 0 | 1 | 2 | 3 | 4 | 5 | 6 | 7 |
| 10 | 0 | 1 | 2 | 3 | 4 | 5 | 6 | 7 | 8 | 9 |
| 1 | 2 | 3 | 4 | 5 | 6 | 7 | 8 | 9 | 10 | 11 |

CONTENT AND QUALITY ADAPTIVE WAVEFRONT SPLIT FOR PARALLEL VIDEO CODING

BACKGROUND

In video compression/decompression (codec) systems, compression efficiency, video quality, and processing efficiency are important performance criteria. For example, visual quality is an important aspect of the user experience in many video applications and compression efficiency impacts the amount of memory storage needed to store video files and/or the amount of bandwidth needed to transmit and/or stream video content. Furthermore, processing efficiency, including processing speed and use of limited computational resources, is an important aspect of encode as there is a continuing desire to encode more quickly and with less power. For example, a video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression and high processing efficiency is desirable.

In some contexts, video encode is performed in a parallel processing environment using, for example, multiple processors or processing cores in parallel to make coding mode decisions for multiple coding units or blocks of a video frame in parallel. Splitting a frame into different regions using wavefront split techniques provide significant performance improvements. Such wavefront splits provide for parallel processing for video blocks in the different regions defined by the wavefront. For example, a wavefront split may increase performance 2× at hardware utilizations of less than 50%. However, such wavefront split techniques cause visual artifacts particularly along the wavefront such as across the middle diagonal of the screen. Such visual artifacts may further propagate to the right and down across the frame from the wavefront split.

There is an ongoing concern with improving subjective video quality in video parallel video encode. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5 illustrates example wavefronts as provided in an exemplary video frame when no wavefront split is employed;

FIG. 6 illustrates example wavefronts as provided in an exemplary video frame when a wavefront split is provided at a mid-frame diagonal thereof;

DETAILED DESCRIPTION

Figure 1:
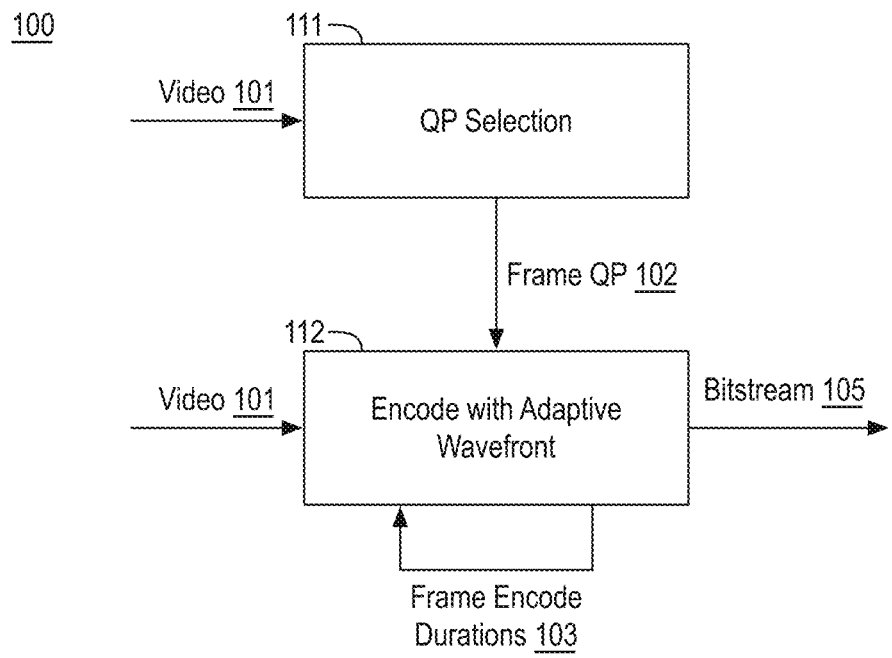
FIG. 1 is an illustrative diagram of an example system for coding video to generate a bitstream.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to parallel video coding and, in particular, to adaptively adjusting a wavefront split in video encode based on video content, quality, and other characteristics.

As described above, it may be advantageous to improve video coding performance by performing at least some video coding operations in parallel. In particular, a video frame may be divided by an encoder into blocks or largest coding units (LCU) or coding tree units (CTU) or the like. As used herein, the term block indicates any pixel region of a video frame such as a 64×64 pixel region although any size may be used. For such blocks, the encoder makes coding decisions such as whether to encode in inter or intra mode and, if inter, what motion vector is employed. To improve compression, spatially adjacent blocks that are above and/or to the left are used for predictors for certain aspects of encoding including merge candidates, motion vector costs, intra most probable mode candidates, etc. Due to dependencies between blocks, the encoder is slowed down as it waits for neighbor blocks to finish mode decision processing before starting to make decisions for a current block. Ignoring such dependencies may harm compression and processing efficiency.

Figure 8:
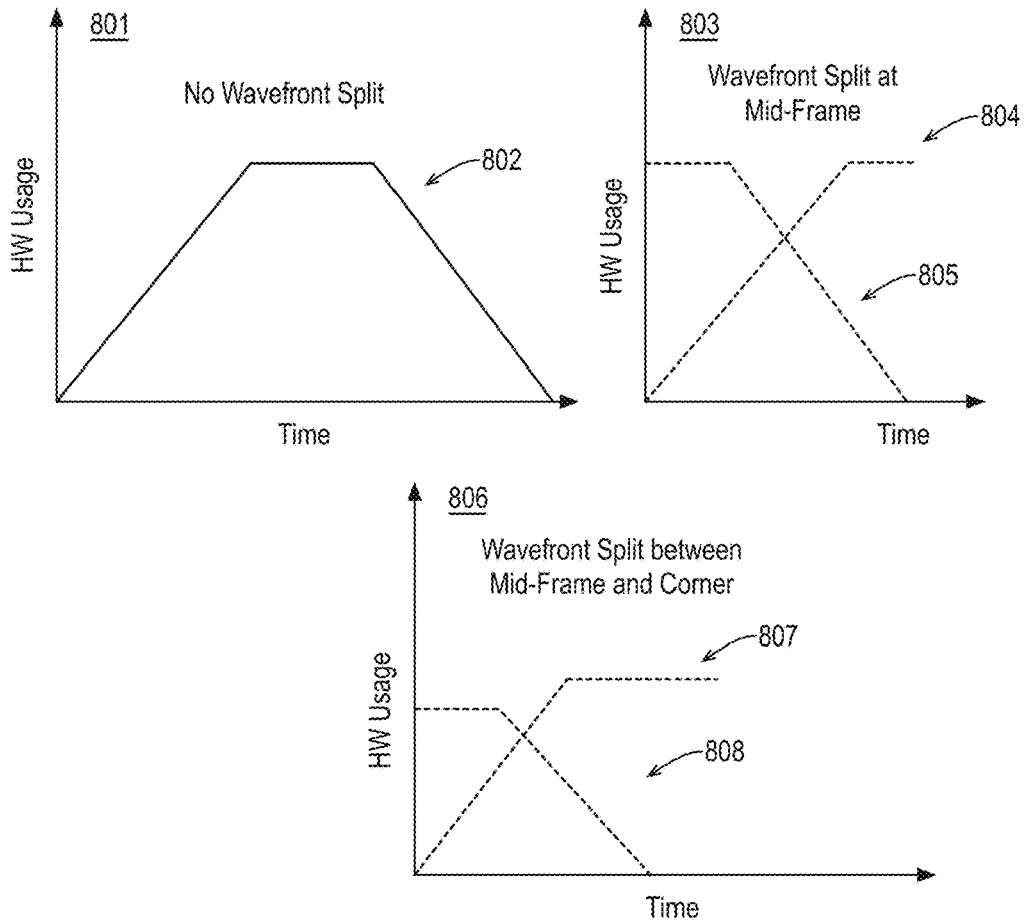
FIG. 8 illustrates exemplary hardware usage according to various wavefront split implementations.

Notably, as a result of the block dependencies, normal encode has a penalty to ramp up the performance and a cool down as well, which is discussed further herein with respect to FIG. 8. The ramp up begins at the top left corner of a frame as the first block needs to be completed at least to resolve dependencies to following blocks before those following blocks can begin processing and so on.

Such limitations cause a ramp up to full block processing parallelization at a maximum parallelization, which then also cools down in the lower right corner of a frame as processing ends. To overcome such limitations, one or more parallel encode wavefronts may be employed by applying a wavefront split that breaks spatial dependencies for blocks after the wavefront split. In such wavefront processing, coding mode decisions, coding, or both for all blocks after the wavefront may also be made in parallel. For example, beginning at the upper left boundary of the video frame and at every upper left corner of the wavefront boundary, blocks may be sequentially labeled such that blocks with the same label (e.g., 0, 1, 2, etc.) are part of the same wavefront. Such wavefront boundaries and parallel block processing techniques are discussed further herein. Notably, the wavefront numbers of 0, 1, 2, etc. are for understanding of the general order but all of the 0s do not need to finish before the is can start. Instead, each block begins processing when its individual dependencies are resolved.

For example, for a wavefront split along a diagonal through the frame (e.g., running from the lower left corner to the upper right corner of the frame), the blocks along the diagonal and after the wavefront ignore mode decisions of neighbor blocks above and to the left for the sake of increased parallelization. Substitutes may be used for intra most probable modes and merge candidate motion vectors. Notably, as also illustrated further herein with respect to FIG. 8, while the upper left portion (pre wavefront) of the frame ramps up, the lower right portion (post wavefront) is running all the blocks along the primary diagonal in parallel. Then, when the lower right portion is ramping down, the upper left portion is starting to run along the diagonal with increased parallelization. Such techniques allow higher encoder hardware utilization at the cost of more defects along and after the wavefront. Such defects are due to the motion field being inconsistent across the wavefront and/or intra prediction variation across the wavefront. For example, without information from neighbor blocks for merge candidates and intra reconstruction, defects across the wavefront are caused and propagated down and to the right across the frame.

Notably, the coding for blocks in each wavefront are performed in parallel for increased processing performance. In some embodiments, coding mode decisions are made in parallel and are then used without modification in block processing encode of the video frame (which may be performed in series for the blocks). Blocks along the wavefront and after the boundary do not have information regarding coding mode decisions for blocks above and to the left of them such as coding mode, intra mode, motion vectors (used as candidates for skip mode, merge mode, etc.) and other information. The techniques discussed herein minimize visual artifacts by varying the location of the wave front split. Also, the parallel performance is varied with respect to frame level QP such that the wavefront split is advantageously applied to balance the need for throughput performance requirements while minimizing the risk of subjective artifacts.

In some embodiments, parallel encoding is provided such that the location of a wavefront split is varied according to the frame level quantization parameter (QP) of the frame. For example, the frame level QP may be determined according to any suitable techniques such as rate distortion techniques and the location of the wavefront split is provided using the frame level QP. For example, when the frame level QP is above an upper threshold (e.g., about 40), no wavefront split may be provided as the high QP provides good throughput (and therefore no parallelization is needed). When the frame level QP is below a lower threshold (e.g., about 25), a maximum split of the frame (e.g., a split diagonally across the middle of the frame when a single wavefront split is used) may be used as the low QP provides high quality and lower defects. When the frame level QP is between such thresholds, a wavefront split beginning at a corner of the frame such as the lower right corner of the frame may be provided with the wavefront moving toward the center of the frame as the frame level QP decreases. Such techniques provide a balance between throughput (increasing parallelization as QP decreases and processing time increases) and defects, which propagate from the wavefront spilt. Furthermore, such techniques move such defects toward a corner of the frame at higher QPs, which is less noticeable to the viewer. In some embodiments, two such wavefront splits are applied moving inward with frame level QP reduction from the top left and bottom right corners of the video frame.

In addition or in the alternative, in some embodiments, the wavefront split may be adapted to the content of the video frame. For example, when the frame level QP is within the threshold range discussed above, the wavefront (or multiple wavefronts) may be provided along detected boundaries between low complexity portions of the frame and high complexity portions of the frame. Such boundaries may segment the frame such that there is low or no dependence between the portions and, therefore, a wavefront split therebetween may provide very few or no defects.

The techniques discussed herein provide parallel wavefront split frame encode for improved performance with reduced and/or less noticeable visible artifacts. The techniques may be employed in any parallel processing compute environment such as via employment of multi-core central processing units (CPUs), multi-core graphics processing units (GPUs), multi-core GPU accelerators, etc.

FIG. 1 is an illustrative diagram of an example system 100 for coding video 101 to generate a bitstream 105, arranged in accordance with at least some implementations of the present disclosure. As shown in FIG. 1, system 100 includes a QP selection module 111 and an encode module 112 (labeled encode with adaptive wavefront). It is noted that the parallel processing discussed herein may apply to encode mode decisions, encode, or both. In some embodiments, block level encode mode decisions are made in parallel using the discussed wavefront techniques while block encode itself is performed using, without alteration, such block level encode mode decisions. Such block encode may be performed in series or in parallel. Notably, block level encode mode decisions may provide a bulk of the task performed by the encoder and may benefit from parallel processing. For example, encode module 112 may include a mode decision module and an encoder to implement such techniques.

Each of QP selection module 111 and encode module 112 are illustrated separately for the sake of clarity. However, such modules may be implemented in the same or different encode software, hardware, firmware, etc. System 100 provides video compression and system 100 may be a portion of a video encode system implemented via a computer or computing device such as a computing system or the like. For example, system 100 receives video 101 (e.g., video data) and generates bitstream 105 that may be decoded by a decoder to generate a decompressed version of video 101. Bitstream 105 may be compatible with a video compression-decompression (codec) standard such as, for example, HEVC (High Efficiency Video Coding), AVC (Advanced Video Coding/H.264/MPEG-4 Part 10), VVC (Versatile Video Coding/MPEG-I Part 3), VP8, VP9, Alliance for Open Media (AOMedia) Video 1 (AV1), the VP8/VP9/AV1 family of codecs, etc. System 100 may be implemented via any suitable device such as, for example, server, a personal computer, a laptop computer, a tablet, a phablet, a smart phone, a digital camera, a gaming console, a wearable device, a display device, an all-in-one device, a two-in-one device, or the like. For example, as used herein, a system, device, computer, or computing device may include any such device or platform.

System 100 may include other modules or sub-modules not shown for the sake of clarity of presentation. For example, system 100 may include a downsampler and an encode controller, a transform module, a quantization module, an intra prediction module, an inter prediction module, a reference picture buffer, a scanning module, an entropy encoder, etc., which may be implemented via QP selection module 111 and encode module 112. Such modules are known to those of skill in the art and are not discussed further herein with respect to FIG. 1 for the sake of clarity of presentation.

As shown, system 100 receives video 101. Video 101 may include any video sequence for encode. Such video may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 8K resolution video, or the like, and the video may include any number of video frames, sequences of video frames, pictures, groups of pictures, or the like. Techniques discussed herein are discussed with respect to frames, portions, blocks, and sub-blocks having various sizes for the sake of clarity of presentation. As used herein, a block or coding unit may be any size and shape such that it includes a plurality of pixel samples (typically square or rectangular) in any suitable color space such as YUV. Furthermore, a block or coding unit may have sub-blocks or prediction units, which also may be characterized as blocks depending on context. Also a block, sub-block, or coding unit may be optionally divided into a transform block or transform unit for the purposes of transformation of residuals. As used herein, the term size indicates the size of such coding units, transform units, etc. and does not necessarily include the unit itself. The term coding unit or transform unit may indicate the size thereof. Such frames may be characterized as pictures, video pictures, sequences of pictures, video sequences, etc., such coding units or blocks may be characterized as largest coding units, coding units, coding blocks, macroblocks, sub-units, sub-blocks, etc.

For example, a picture or frame of color video data may include a luminance plane or component and two chrominance planes or components at the same or different resolutions with respect to the luminance plane. The video may include pictures or frames that may be divided into blocks of any size, which contain data corresponding to blocks of pixels. Such blocks may include data from one or more planes or color channels of pixel data. For example, a block may be a coding unit or a partition thereof. In the context of the High Efficiency Video Coding (HEVC), the HEVC standard defines a coding tree unit (CTU) for a picture (e.g., a video frame of a video sequence) that may be partitioned into coding units (CUs) that take the form of rectangular blocks having variable sizes. Such coding units may be used as the basic unit or block for coding. Such coding units may be partitioned into transform units (TUs) for transform that also take the form of rectangular blocks (typically square) having variable sizes. However, as discussed, the block of video data may include any block of video data and any coding standard may be used.

Bitstream 105 may be any bitstream representative of video 101 such as an HEVC compliant bitstream or a bitstream compliant to any other codec. During encode of frames of video 101, any number of coding modes, coding unit partitions, transform unit partitions, and so on are evaluated to arrive at final coding modes for units or portions of video 101. Such final coding modes for video 101 as well as other coding information are provided in bitstream 105.

As shown, QP selection module 111 selects a frame level QP (frame QP) 102 for each frame of video 101. QP selection module 111 may selected each frame level QP 102 using any suitable technique or techniques such as rate distortion optimization techniques. Frame level QPs 102 are transferred from QP selection module 111 to encode module 112. Encode module 112 encodes each frame of video 101 according to its corresponding frame level QP 102 and, optionally, based on previous frame encode durations 103, as discussed further herein below. Furthermore, encode module 112 applies a wavefront during encode based on frame level QP 102. For example, during encode, a video frame of video 101 is divided into spatial blocks or portions that are predicted from the pixels surrounding the block or portion (spatial/intra prediction) or from pixels of a prior or subsequent frame with a similar region to the block or portion (temporal/inter prediction). The block or portion may optionally be divided into different size sub-blocks or sub-portions that have different available modes. The decision between all of these choices makes up the coding mode selection, which is then implemented during encode.

Figure 2:
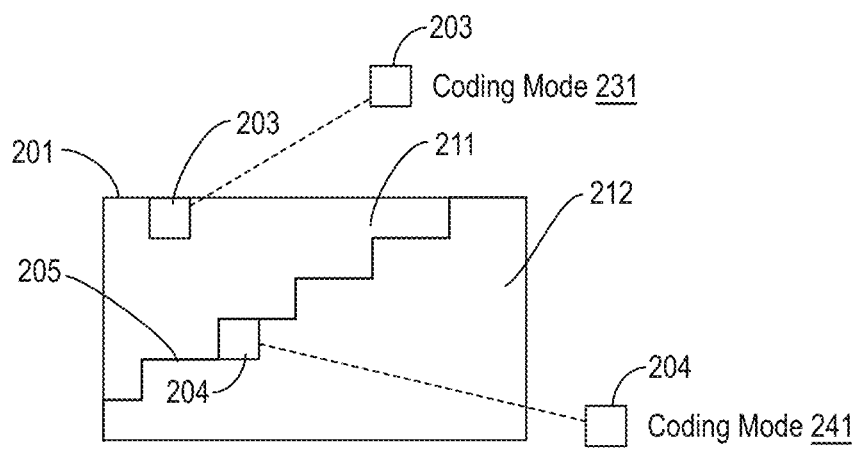
FIG. 2 illustrates an example video frame of video.

FIG. 2 illustrates an example video frame 201 of video 101, arranged in accordance with at least some implementations of the present disclosure. As shown, video frame 201 may be segmented into one or more blocks or portions as illustrated with respect to blocks 203, 204. Blocks 203, 204 may be further divided into coding or prediction sub-blocks and transform blocks during encode. In some embodiments, video frame 201 is segmented into coding blocks, which are segmented into transform blocks. However, any picture structure may be used that divides the frame into macroblocks, blocks, units, sub-units, etc. As used, herein, the term block may refer to any partition or sub-partition of a video picture that is at the sub-picture and sub-slice level. For example, a block may refer to a coding unit.

Furthermore, video frame 201 may be divided by a parallel processing split boundary 205 such that coding mode decisions are made in parallel and/or block coding (e.g., implementing the coding mode decisions to generate quantized coefficients for the block) is performed in parallel for at least some of blocks in region 211 of video frame 201 (e.g., blocks above and to the left of parallel processing split boundary 205) and at least some of blocks in region 212 of video frame 201 (e.g., blocks below and to the right of parallel processing split boundary 205). That is, one or more blocks in region 211 are processed in parallel with one or more blocks in region 212 as well as blocks within regions 211, 212 being processed in parallel. As used herein, the terms pre- and post-wavefront split regions or portions indicate those regions or portions above and to the left of the wavefront or boundary and those regions or portions below and to the right of the wavefront or boundary, respectively. Such terms are relative to the convention that encode (and decode) progress from the top left of video frame 201. As used herein, the term parallel processing split boundary, wavefront boundary, wavefront split boundary, wavefront split, and similar terms are used interchangeably herein and indicate a boundary between blocks of a video frame such that, across the boundary, spatial dependency is broken and the assignment of blocks to wavefronts within the video frame is restarted and shared with respect to blocks in the pre-wavefront split region.

For example, coding mode decisions and/or encode may be performed for block 203 and block 204 at least partially in parallel. As used herein, the term parallel processing or similar terms indicate the processing overlaps temporally at least partially. For example, a first temporal window defined by a start and end time of a first task (e.g., coding mode decisions for a first block) at least partially overlaps with a second temporal window defined by a start and end time of a second task (e.g., coding mode decisions for a second block). In some embodiments, the start times of parallel tasks begin substantially simultaneously. However, any parallel processing context may be employed.

For each block of video frame 201, a coding mode is selected as illustrated with respect to coding mode 231 as selected for block 203 and coding mode 241 as selected for block 204. Notably, in response to block 204 being immediately adjacent to parallel processing split boundary 205, coding mode selection for block 204 is made without information from neighboring blocks. Furthermore, since neighboring information is available for block 203 (as well as many other blocks of video frame 201) not immediately adjacent to parallel processing split boundary 205, such neighboring information is used in the coding mode selection thereof.

In the example of FIG. 2, parallel processing split boundary 205 (or, simply, a wavefront) is illustrated as dividing video frame 201 equally in half along a diagonal running substantially from a lower left corner to an upper right corner of video frame 201. As discussed herein, such processing may be performed when a frame level QP is less than a predetermined threshold. In other contexts, parallel processing split boundary 205 is moved within video frame 201 based on the frame level QP of video frame 201.

Figure 3:
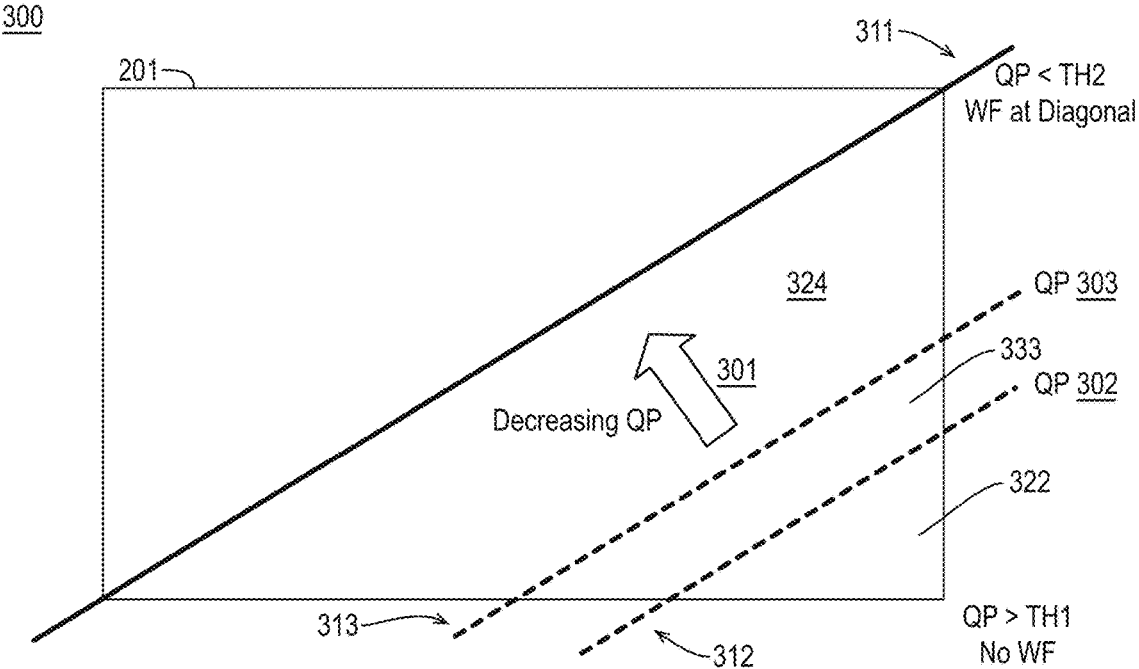
FIG. 3 illustrates exemplary adaptation of a wavefront split location within video frame based on the frame level quantization parameter thereof.

FIG. 3 illustrates exemplary adaptation 300 of a wavefront split location within video frame 201 based on the frame level quantization parameter thereof, arranged in accordance with at least some implementations of the present disclosure. In the example of FIG. 3, example wavefront splits and a frame diagonal are illustrated as straight lines for the sake of clarity of presentation. It is noted that such wavefront splits, in practice, follow block boundaries and are therefore jagged lines. As shown, wavefront adaptation 300 adapts the location of wavefront splits 312, 313 within video frame 201 during coding (e.g., during encode mode selection, encode, or both) based on frame level QP in a direction 301 with decreasing frame level QP.

For example, in response to frame level QP 302, a corresponding wavefront split 312 is applied such that, during encode, blocks in post-wavefront split region 322 are processed as discussed with respect to region 212. That is, blocks immediately below and to the right of wavefront split 312 begin coding in parallel with upper left blocks of region 211 and without information from blocks across wavefront split 312 and such parallel coding cascades down and to the right from wavefront split 312. Furthermore, blocks in pre-wavefront split region 324, which extends from the upper left block of video frame 201 to the implemented wavefront, are processed as discussed with respect to region 211 such that a ramp up to parallelization occurs.

As shown, with decreasing frame level QP, the implemented wavefront moves toward a mid-frame diagonal 311 of video frame 201. In some embodiments, when the frame level QP of video frame 201 is greater than a threshold QP such as 41, 42, 43 or similar value, no wavefront split is employed during coding of video frame 201 (e.g., application of a wavefront split is disabled). Herein, exemplary QP values are provided relative to the HEVC standard; however, any suitable QP range of values may be used such that encode quality decreases with increasing QP (e.g., step size). In some embodiments, the upper threshold used herein is a percentage of a maximum allowable QP such as 75-80% of the maximum allowable QP, 80-85% of the maximum allowable QP, 85-90% of the maximum allowable QP, or 75-90% of the maximum allowable QP. Such percentages assume QP starts at 0 and the threshold QP may be adjusted to begin at a different minimum allowable QP value.

Similarly, when the frame level QP of video frame 201 is less than a threshold QP such as 22, 23, 24 or similar value, a wavefront split is employed at mid-frame diagonal 311 during parallel coding of video frame 201. In some embodiments, the lower threshold used herein is a percentage of a maximum allowable QP such as 40-45% of the maximum allowable QP, 45-50% of the maximum allowable QP, 50-55% of the maximum allowable QP, or 40-55% of the maximum allowable QP.

In cases between the lower and upper thresholds, the wavefront split is employed at a location of video frame 201 depending on QP such that, as discussed, with decreasing QP, the wavefront moves from the lower right corner of video frame 201 to mid-frame diagonal 311 of video frame 201. For example, as illustrated with respect to frame level QPs, 302, 303 such that frame level QP 303 is less than frame level QP 302, wavefront split 312 is farther from mid-frame diagonal 311 (and closer to the lower right corner of video frame 201) with respect to wavefront split 313. Furthermore, in response to level QP 303 being less than frame level QP 302, post-wavefront split region 322 is smaller by area and by number of coding units than post-wavefront split region 333 (which extends from wavefront split 313 to the lower right corner of video frame 201). Similarly, pre-wavefront split region 324 is larger by area and by number of coding units when wavefront split 312 is employed than when wavefront split 313 is used. As used herein the term area of a region with respect to a video frame indicates the number of pixels in the region, the number of coding units in the region, or the like.

Such processing is then repeated for frames of video 101 such that adaptive wavefront split locations are provided for the frames with some frames having no wavefront split (frame level QP>TH1), some frames having a wavefront split implemented at mid-frame diagonal 311 (frame level QP<TH2), and other frames having a wavefront split in between with the location dependent on the frame level QP.

It is noted that such wavefront split locations may also be varied based on previous frame encode durations as discussed herein below. In some embodiments, frame level QP 303 may be determined for a first frame of video and frame level QP 302 may be determined for a second frame of the video such that frame level QP 303 is less than frame level QP 302 as shown. During encode of the first and second frames (e.g., during encode mode selection and/or block encode), wavefront split 313 divides the first frame into regions 324, 333 for parallel encode and wavefront split 312 divides the second frame into regions 324, 322 for parallel encode, respectively, such that, as shown, region 333 is larger than region 322 in response to frame level QP 303 being less first frame level QP 302.

Notably, such techniques disable wavefront splitting when QP is high, which corresponds to higher encode throughput performance (e.g., as QP increases, encode resolves to larger blocks and fewer coefficients, which increases performance) and to instances where use of a diagonal wavefront split would cause the most defects. The wavefront split is then moved starting from the lower right corner of the frame toward the middle of the frame. As QP decreases from the upper QP threshold, the number of coding units after the wavefront split increases, which decreases the area of the frame with potential subjective visual issues because of the wavefront split.

Wavefront splits such as wavefront splits 312, 313 may be provided with respect to decreasing QP (from no wavefront split to wavefronts split at mid-frame diagonal 311) using any suitable technique or techniques such as a linear movement with decreasing QP between the upper threshold QP (TH1) and the lower threshold QP (TH2)

Figure 4:
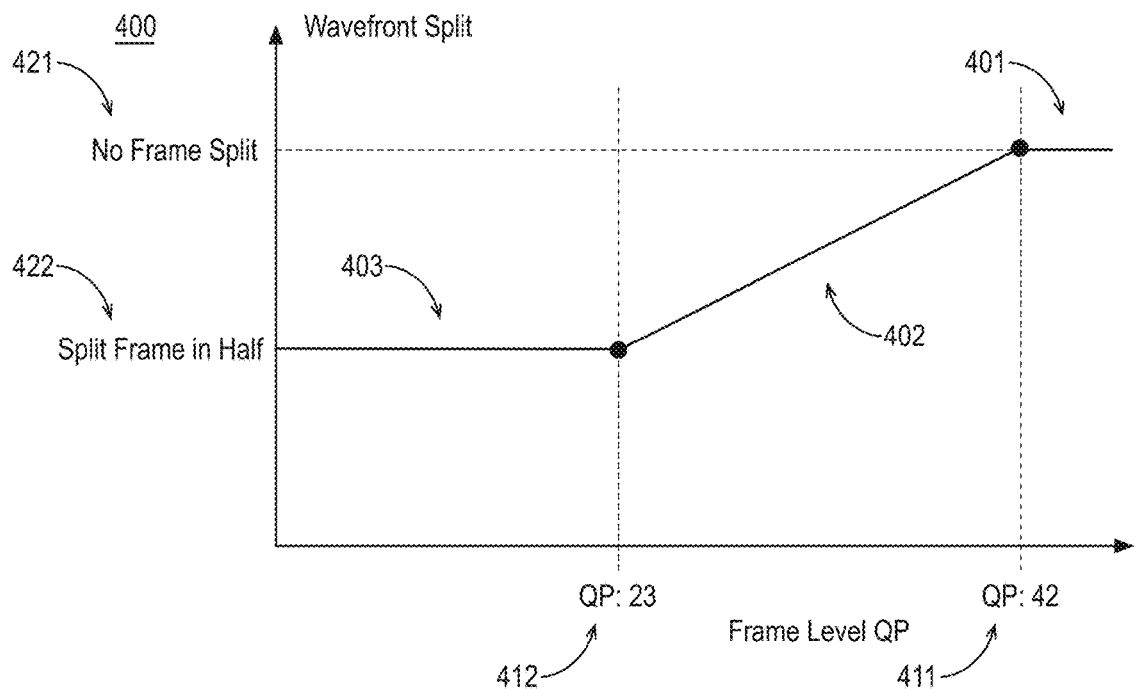
FIG. 4 illustrates an exemplary implementation of wavefront splits beginning at the corner of a video frame and adapted based on frame level quantization parameter.

FIG. 4 illustrates an exemplary implementation 400 of wavefront splits beginning at the corner of a video frame and adapted based on frame level quantization parameter, arranged in accordance with at least some implementations of the present disclosure. As shown, with respect to region 401 of implementation 400, when the frame level QP (as shown on the x-axis) meets or exceeds upper frame level QP threshold 411 (e.g., 42 in the illustrated example), no frame split 421 is provided (with wavefront split illustrated on the y-axis). Furthermore, when the frame level QP is at or below lower frame level QP threshold 412 (e.g., 23 in the illustrated example), as shown with respect to region 403 of implementation 400, a diagonal wavefront split 422 is provided that splits the frame in half (e.g., at mid-frame diagonal 311). Between upper frame level QP threshold 411 and lower frame level QP threshold 412, as shown with respect to region 402, the wavefront split is moved in a substantially linear manner between no frame split 421 and diagonal wavefront split 422. It is noted that fully linear movement of the wavefront split with respect to frame level QP may not be possible due to the division of video frame 201 into blocks and the nature of the wavefront split following block boundaries and, therefore, a pseudo-linear or linear approximating movement of the wavefront split based on frame level QP may be employed.

The graph illustrated by implementation 400 shows the adaptive nature of how much video frame 201 is split with frame level QP with it potentially hitting a maximum split point where the frame is split in half along a diagonal. Notably, in contexts when the frame is split in half, due to the low frame level QP and allowed number of encoded coefficients representing the coded blocks, \visible artifacts due to the wavefront split tend to be negligible.

FIG. 5 illustrates example wavefronts 500 as provided in exemplary video frame 201 when no wavefront split is employed, arranged in accordance with at least some implementations of the present disclosure. As shown, video frame 201 is divided or partitioned into any number of blocks 502 of any suitable size such as 64×64 pixel blocks. In the illustrated example, video frame 201 is divided into 77 blocks for the sake of clarity of presentation. However, in practice, video frame 201 may be divided into hundreds or thousands of blocks. Furthermore, each of blocks 502 may be assigned to a wavefront, as shown with respect to the numerical labels within blocks 502, such that coding mode decisions, block encode, or both for each of the blocks in a wavefront are performed in parallel. For example, each wavefront may be established such that, prior to selecting a coding mode for each block, the coding modes are selected for all blocks above, to the left, and above and to the right of each block (except for those blocks on top and left boundaries of video frame). For example, block 503 is assigned to wavefront 0, block 504 is assigned to wavefront 1, and the coding modes of blocks 503, 504 cannot be processed in parallel with any other blocks. Blocks 505, 506 are assigned to wavefront 2 and can be processed in parallel after their corresponding wavefront 1 blocks are complete (e.g., after block 304 is processed), and so on such that the blocks in each wavefront may be processed in parallel. That is, blocks labeled with 4 can be processed in parallel after blocks labeled above and to the left with 3 and less are processed, blocks labeled with 5 can be processed in parallel after blocks above and to the left labeled with 4 and less are processed, and so on. Furthermore, to begin such processing, the previous wavefront block need not be completely processed, instead only the dependencies need to be resolved (e.g., data needed to process the following block needs to be attained but other processing for the preceding block may still be performed). As discussed, no wavefront split implementations may be provided in the techniques discussed herein when the frame level QP of video frame 201 meets or exceeds an upper frame level QP threshold.

FIG. 6 illustrates example wavefronts 600 as provided in exemplary video frame 201 when a wavefront split is provided at a mid-frame diagonal thereof, arranged in accordance with at least some implementations of the present disclosure. As with FIG. 5, video frame 201 is divided or partitioned into blocks 502. In the example of FIG. 6, parallel processing split boundary 605 is established within video frame 201 at a diagonal of video frame 201. For example, at the top left of video frame 201 (e.g., in pre-wavefront split region 603 of video frame 201), wavefronts are established such that coding mode selection and/or block coding for a target block awaits coding mode selection and/or block coding for those blocks on which the target block depends, as with the example of FIG. 5. For example, all blocks in pre-wavefront split region 603 that are in wavefront 4 must await coding mode decisions of their corresponding blocks in wavefront 3 as discussed above. Parallel processing split boundary 605 breaks this dependency and restarts wavefronts 0 and 1 along and immediately adjacent to parallel processing split boundary 605. As used herein, the term immediately adjacent with respect to a boundary indicates the boundary shares an edge of a block. For example, block 604 is immediately adjacent to parallel processing split boundary 605 since the top and left edges of block 604 is shared with a portion of parallel processing split boundary 605. Similarly, block 606 is immediately adjacent to parallel processing split boundary 605 since the top edge of block 606 is shared with a portion of parallel processing split boundary 605. Such dependency breaking may also be illustrated with respect to block 604, which, without such dependency breaking, would need to await a coding mode decision from block 608. As shown, in post-wavefront split region 607, after the dependency break of parallel processing split boundary 605, such spatial dependency is resumed within post-wavefront split region 607. In some embodiments, parallel processing split boundary 605 is a wavefront parallel processing split boundary that defines parallel coding mode selection, parallel block coding, or both for blocks having the same wavefront designation, whether within the same or different regions 603, 607.

It is noted that within regions 603, 607, wavefronts are numbered sequentially from left to right with each block having a left edge along a boundary beginning at a lowest available wavefront. For example, all blocks, including block 604, having a left edge immediately adjacent to parallel processing split boundary 605 is in wavefront 0 and blocks to the right are part of a wavefront in a sequentially increasing order. Due to the discussed spatial dependency break, dramatically increased parallelism is attained. All blocks labeled with the same wavefront may again be processed in parallel. As shown, the example of FIG. 6 has 12 wavefronts (reduced from 23 in the example of FIG. 5). As discussed, full diagonal wavefront split implementations may be provided in the techniques discussed herein when the frame level QP of video frame 201 is at or below a lower frame level QP threshold. As with FIGS. 5, 7, and 10, like numbered blocks are processed at least partially in parallel during encode.

Figure 7:
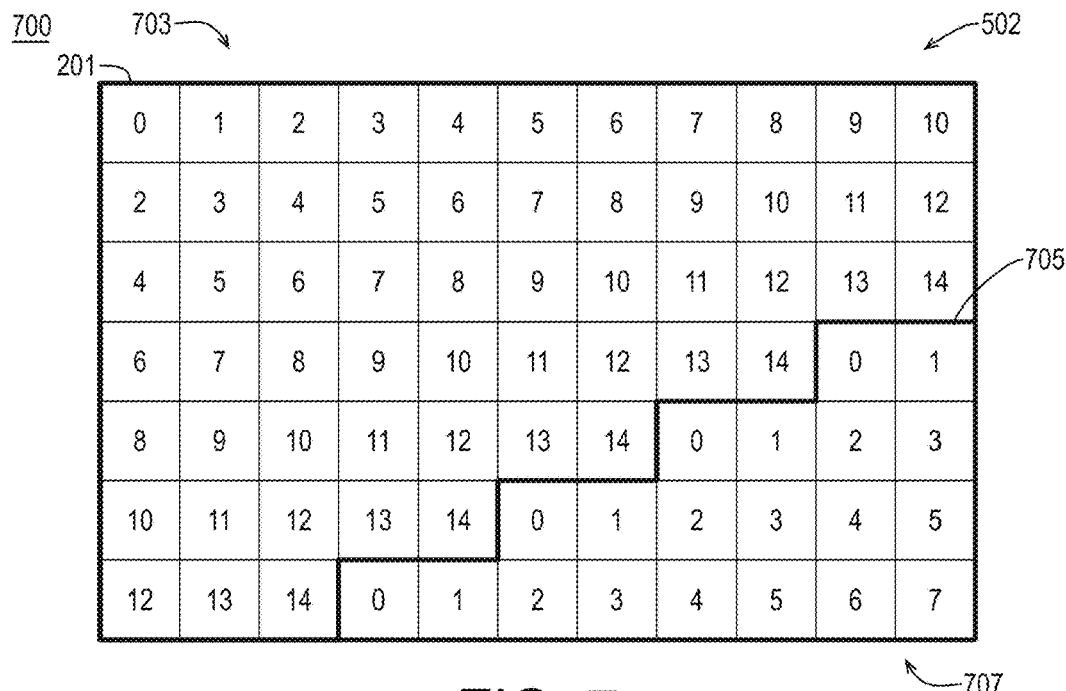
FIG. 7 illustrates example wavefronts as provided in an exemplary video frame when a wavefront split is provided between a bottom right corner and a mid-frame diagonal thereof based on a frame level quantization parameter.

FIG. 7 illustrates example wavefronts 700 as provided in exemplary video frame 201 when a wavefront split is provided between a bottom right corner and a mid-frame diagonal thereof based on a frame level quantization parameter, arranged in accordance with at least some implementations of the present disclosure. As above, video frame 201 is divided or partitioned into blocks 502. In the example of FIG. 7, parallel processing split boundary 705 is established within video frame 201 based on frame level QP as discussed herein. In pre-wavefront split region 703 of video frame 201, wavefronts are established such that coding mode selection and/or block coding for a target block awaits coding mode selection and/or block coding for those blocks on which the target block depends, as discussed elsewhere herein such that, for example, all blocks in pre-wavefront split region 703 that are also in wavefront 4 must await coding mode decisions of wavefronts 0 to 3. Parallel processing split boundary 705 again breaks this dependency and restarts wavefronts 0 and 1 along and immediately adjacent to parallel processing split boundary 705 as discussed with respect to FIG. 6. In post-wavefront split region 707, after the dependency break of parallel processing split boundary 705, such spatial dependency is resumed. Using the wavefronts established based on parallel processing split boundary 705, the like number blocks may be processed (e.g., for coding mode selection, parallel block coding, or both) in parallel, whether within the same or different regions 603, 607. In the example of FIG. 7, 14 wavefronts are used (fewer than the 23 in the example of FIG. 5 but more than the 12 in FIG. 6). Parallel processing split boundary 705 provides less parallelization efficiency than the example of FIG. 6; however, the increased QP mitigates this loss from a processing efficiency perspective. Furthermore, the movement of any resultant artifacts due to the higher QP are moved away from the center diagonal of video frame 201 and are therefore less likely to be noticed as a distraction by a viewer. As discussed, a diagonal wavefront split between the lower right corner and the center of video frame 201 may be provided in the techniques discussed herein when the frame level QP of video frame 201 is between the lower and upper frame level QP thresholds, and such that parallel processing split boundary 705 moves toward the center of video frame 201 with decreasing frame level QP.

FIG. 8 illustrates exemplary hardware usage according to various wavefront split implementations, arranged in accordance with at least some implementations of the present disclosure. As shown in FIG. 8 with respect to no wavefront split implementation 801, in such contexts, over time (as provided on the x-axis), hardware (HW) usage 802 at an encoder increases as parallelization increases from a top left corner of the frame (please refer to FIG. 5). That is, the ramp up increases HW utilization from 1 block (wavefronts 0, 1) at a time to 2 blocks at a time (wavefronts 2, 3) to 3 blocks at a time (wavefronts 4, 5), and so on. After peak parallelization has been reached (at a wavefront with a maximum number of parallel blocks), maximum HW utilization is achieved until a wavefront in the frame where the number of blocks begins to reduce. Such a ramp down or cool down then reduces parallelization (and HW utilization) until the frame completes processing.

Furthermore, as shown with respect to mid-frame diagonal wavefront split implementation 803, in such contexts, over time hardware (HW) usage at an encoder is shared between the pre-wavefront split blocks, which are illustrated with respect to pre-wavefront usage 804, and post-wavefront split blocks, which are illustrated with respect to post-wavefront usage 805. Pre-wavefront usage 804 has a ramp up increase in HW utilization in the same manner as discussed with respect to HW usage 802 but has no ramp down as the processing of pre-wavefront blocks ends with parallel block coding in process. Post-wavefront usage 808 has no ramp up due to parallel processing beginning after the wavefront split and then has a cool down as discussed with respect to HW usage 802. By providing the mid-frame diagonal wavefront split in implementation 803, overall HW utilization is increased and the processing duration of the frame is greatly reduced.

Finally, as shown with respect to QP adaptive wavefront split implementation 806, in such contexts where the wavefront split is implemented between the lower right corner of the frame and the mid-frame diagonal, over time hardware (HW) usage at an encoder is shared between the pre-wavefront split blocks, which are illustrated with respect to pre-wavefront usage 807, and post-wavefront split blocks, which are illustrated with respect to post-wavefront usage 808. Pre-wavefront usage 807 again has a ramp up increase in HW utilization. Furthermore, pre-wavefront usage 807 has a longer tail (compared to usage 804) as full parallelization is maintained across mid-frame. It is noted pre-wavefront usage 807 may have a partial cool down depending on whether full parallelization is broken as processing continues (e.g., depending on the location of the wavefront split). Post-wavefront usage 808 has no ramp up due to parallel processing beginning after the wavefront split but may not employ full utilization (again depending on the location of the wavefront split). Post-wavefront usage 808 then has a ramp down as discussed with respect to HW usage 802. By providing the wavefront split away from mid-frame in implementation 806, overall HW utilization is increased and the processing duration of the frame is reduced with respect to implementation 802 but HW utilization is decreased and the processing duration of the frame is increased with respect to implementation 803. The techniques discussed herein therefore provide a balance between defect location and density and HW usage for improved overall performance.

As discussed herein, in some embodiments, the location of a single wavefront is adjusted from an outer corner (e.g., a lower right hand corner) of a frame toward a mid-frame location (e.g., splitting the frame in half diagonally) with lowering frame level QP. In other embodiments, the location of multiple wavefronts may be varied based on the frame level QP. For example, another technique of splitting the frame adaptively is to start at two wavefront splits at corners (e.g., the top left and bottom right corner) of a video frame and move the wavefront splits inward in the same manner with decreasing frame level QP.

Figure 9:
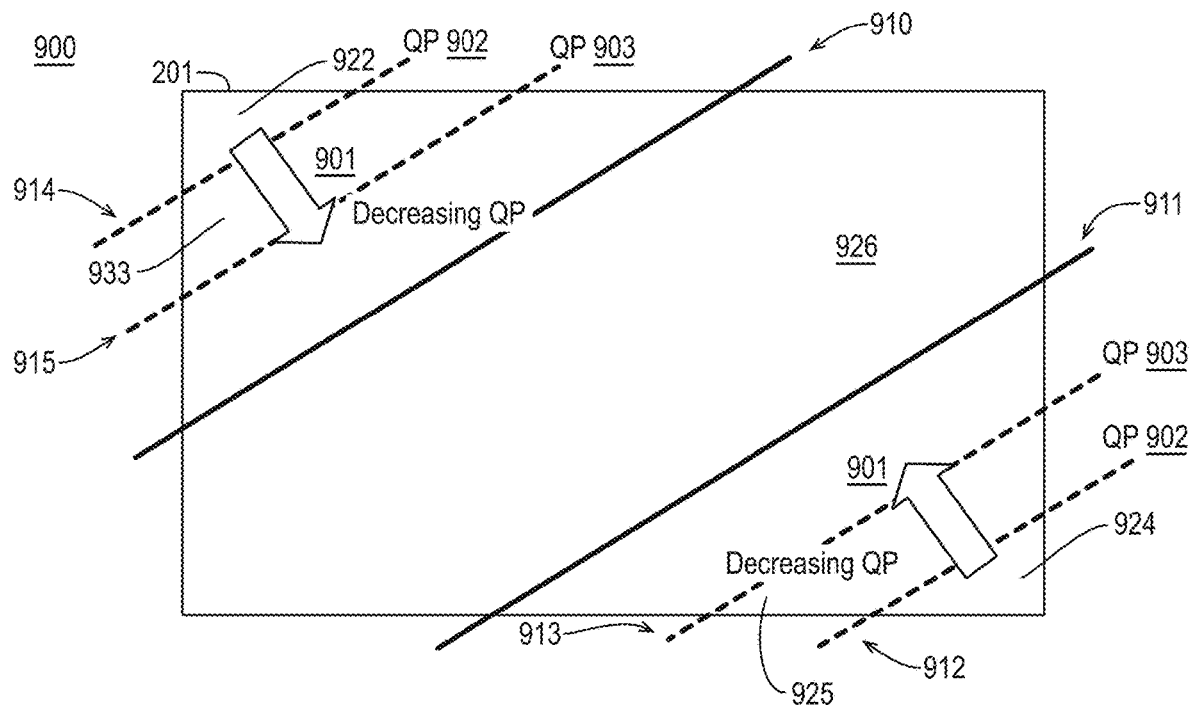
FIG. 9 illustrates exemplary adaptation of multiple wavefront split locations within a video frame based on the frame level quantization parameter thereof.

FIG. 9 illustrates exemplary adaptation 900 of multiple wavefront split locations within video frame 201 based on the frame level quantization parameter thereof, arranged in accordance with at least some implementations of the present disclosure. As with FIG. 3, in the example of FIG. 9, example wavefront splits and a maximum wavefront split locations are illustrated as straight lines for the sake of clarity of presentation; however, in practice, such wavefront splits follow block boundaries and are therefore jagged lines. As shown, wavefront split adaptation 900 adapts the location of wavefront splits 912, 913, 914, 915 within video frame 201 during coding (e.g., during encode mode selection, encode, or both) based on frame level QP in directions 901 from top left and bottom right corners of video fame 201 toward a mid-frame diagonal of video frame 201 with decreasing frame level QP.

For example, in response to frame level QP 902, two corresponding wavefront splits 912, 914 are established and used in encode and, in response to frame level QP 903, which is less than frame level QP 902, two corresponding wavefront splits 913, 915 are established and used in encode. In response to wavefront splits 912, 914, during encode, blocks in pre-wavefront split region 922 are processed as discussed with respect to region 211. That is, blocks in pre-wavefront split region 922 (e.g., above and to the left of wavefronts split 914) ramp up to parallel processing. Furthermore, in response to wavefront splits 912, 914, during encode, blocks in post-wavefront split region 924 (e.g., below and to the right of wavefronts split 912) are processed as discussed with respect to region 212 such that blocks immediately below and to the right of wavefront split 912 begin coding in parallel without information from blocks across wavefront split 912 and such parallel coding cascades down and to the right. Blocks in region 926, which extends from region 922 to region 924 (and may be characterized as a between wavefront splits region) are processed in a similar manner with coding beginning in parallel without sharing information from blocks across wavefront split 914 and continuing in parallel to wavefront split 902. As discussed herein, some blocks from regions 922, 926, 924 are also coded in parallel (e.g., with parallel encoding across wavefront splits 912, 914) as further illustrated in FIG. 10. For example, wavefronts are established within each of regions 922, 926, 924 and parallel processing for blocks in the same wavefronts is performed.

Similarly, in response to wavefront splits 913, 915, during encode, blocks in pre-wavefront split region 933 (which extends from the upper left corner of frame 201 to wavefront split 915) are processed as discussed with respect to region 211, blocks in post-wavefront split region 925 (e.g., extending from wavefronts split 913 to the lower right corner of frame 201) are processed as discussed with respect to region 212, and blocks in region 926, which extends from region 933 to region 925 are processed as discussed above. Notably, some blocks in regions 933, 926, 925 are also coded in parallel with parallel encoding across wavefront splits 913, 915.

As shown, with decreasing frame level QP, the implemented wavefronts move toward maximum wavefront split positions 910, 911. In analogy to mid-frame diagonal 311, maximum wavefront split positions 910, 911 divide video frame 201 with the largest post-wavefront split area (and largest pre-wavefront split area and minimum between wavefront split area) and about equally such that about one-fourth of the frame is pre-wavefront split (e.g., analogous to regions 922, 923), about one-half of the frame is between the wavefront splits (e.g., analogous to region 926), and one-fourth of the frame is post-wavefront split (e.g., analogous to regions 924, 925). In an embodiment, an area of the region between the wavefront splits is within two percent of a sum of areas of the pre- and post-wavefront split regions in response to the frame level QP being less than the lower threshold QP. In some embodiments, when the frame level QP of video frame 201 is greater than the upper threshold QP (such as 41, 42, 43 or similar value as discussed above), no wavefront split is employed during coding of video frame 201. Furthermore, when the frame level QP of video frame 201 is less than the lower threshold QP (such as 22, 23, 24 or similar value, as discussed above) wavefront splits are applied at maximum wavefront split positions 910, 911 during parallel coding of video frame 201.

Between the lower and upper thresholds, the wavefront splits are applied at locations between the corners of video frame 201 and maximum wavefront split positions 910, 911 based on the frame level QP, with movement from the corners with decreasing frame level QP. For example, as illustrated with respect to frame level QPs, 902, 903, frame level QP 903 is less than frame level QP 902, and wavefront splits 912, 914) are farther from maximum wavefront split positions 910, 911 (and closer to their respective corners). Furthermore, in response to level QP 903 being less than frame level QP 902, regions 933, 925 are larger than regions 922, 924, respectively.

As with a single wavefront split, such processing is repeated for frames of video 101 such that adaptive wavefront split locations are provided for the frames with some frames having no wavefront splits (frame level QP>TH1), some frames having wavefront splits at maximum wavefront split positions 910, 911 (frame level QP<TH2), and other frames having wavefront splits dependent on the frame level QP as illustrated. For example, frame level QP 903 may be determined for a first frame of video and frame level QP 902 may be determined for a second frame of the video such that frame level QP 903 is less than frame level QP 902 as shown. During encode of the first and second frames (e.g., during encode mode selection and/or block encode), wavefront splits 912, 914 divide the first frame into regions 922, 926, 924 for parallel encode and wavefront splits 913, 915 divide the second frame into regions 933, 926, 925 for parallel encode, respectively, such that, as shown, region 933 is larger than region 922 and region 925 is larger than region 924 in response to frame level QP 903 being less first frame level QP 902.

Figure 10:
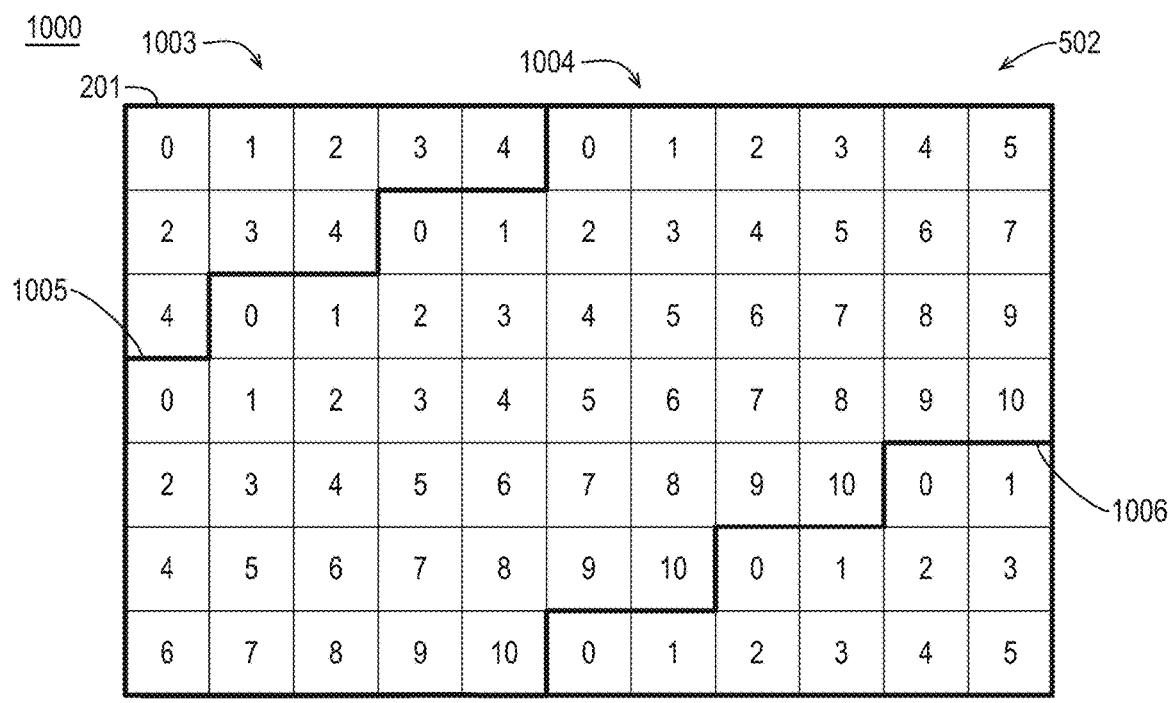
FIG. 10 illustrates example wavefronts as provided in an exemplary video frame when multiple wavefront splits are provided based on a frame level quantization parameter.

FIG. 10 illustrates example wavefronts 1000 as provided in exemplary video frame 201 when multiple wavefront splits are provided based on a frame level quantization parameter, arranged in accordance with at least some implementations of the present disclosure. As above, video frame 201 is divided or partitioned into blocks 502. In the example of FIG. 10, parallel processing split boundaries 1005, 1006 are applied in video frame 201 based on frame level QP as discussed above. In pre-wavefront split region 1003 of video frame 201, wavefronts are established such that coding mode selection and/or coding for a target block awaits coding mode selection and/or block coding for those blocks on which the target block depends, as discussed elsewhere herein. For example, all blocks in pre-wavefront split region 1003 that are also in wavefront 4 must await coding mode decisions of their respective blocks in wavefronts 0 to 3. Parallel processing split boundary 1005 breaks this dependency and restarts wavefronts 0 and 1 along and immediately adjacent to parallel processing split boundary 1005. In between wavefront split region 1004, after the dependency break of parallel processing split boundary 1005, such spatial dependency is resumed. Similarly, such a dependency break is provided by parallel processing split boundary 1006, such spatial dependency is again resumed after parallel processing split boundary 1006. Based on the wavefronts established using parallel processing split boundaries 1005, 1006, the like number blocks may be processed (e.g., for coding mode selection, parallel block coding, or both) in parallel, whether within the same or different regions 1003, 1004, 1007. In the example of FIG. 10, 10 wavefronts are used. Notably, increased parallelization may be provided by moving parallel processing split boundaries 1005, 1006 toward a mid-frame diagonal of video frame 201 as discussed herein.

Figure 11:
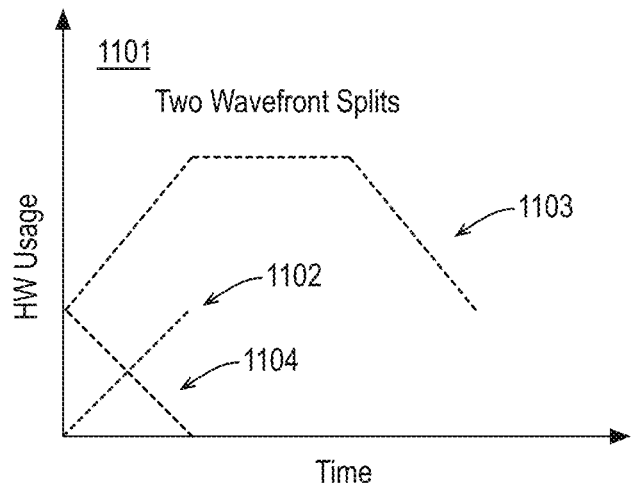
FIG. 11 illustrates exemplary hardware usage according to multiple wavefront split implementations.

FIG. 11 illustrates exemplary hardware usage according to multiple wavefront split implementations, arranged in accordance with at least some implementations of the present disclosure. As shown in FIG. 11 with respect to two wavefront split implementation 1101, over time HW usage at an encoder is shared between the pre-wavefront split blocks, which are illustrated with respect to pre-wavefront usage 1102, between wavefront split blocks, which are illustrated with respect to between wavefront usage 1103, and post-wavefront split blocks, which are illustrated with respect to post-wavefront usage 1104. Pre-wavefront usage 1102 has a ramp up increase in HW utilization from no parallel processing and, in the illustrated example finishes before full parallelization is reached (although in some examples full parallelization may be achieved. Between wavefront usage 1103 has a ramp up increase in HW utilization from a starting point including some parallel processing and cool down after a peak parallel usage. Finally, post-wavefront usage 1104 has no ramp up due to parallel processing beginning after the second wavefront split but may not employ full parallelization (depending on the location of the second wavefront split). Post-wavefront usage 1104 then has a ramp down as above.

Figure 12:
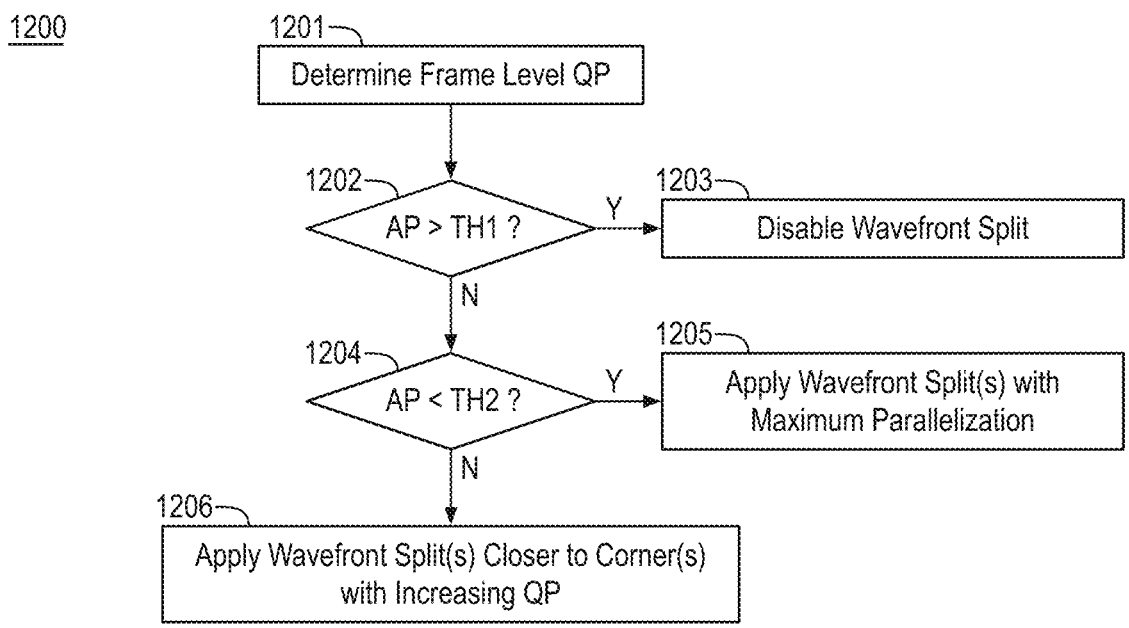
FIG. 12 illustrates an exemplary adaptive wavefront split process based on frame level quantization parameter.

FIG. 12 illustrates an exemplary adaptive wavefront split process 1200 based on frame level quantization parameter, arranged in accordance with at least some implementations of the present disclosure. Process 1200 may include one or more operations 1201-1206 as illustrated in FIG. 12. Process 1200 may be performed by a device (e.g., system 100 as discussed herein) to perform wavefront split processing adaptive to frame level QP.

Processing begins at operation 1201, where a frame level QP is determined for a particular frame. The frame level QP may be determined using any suitable technique or techniques such as rate distortion optimization techniques, group of picture QP application techniques, or the like. In some embodiments, the frame level QP is adjusted based on a previous frame encode duration as discussed further herein with respect to FIG. 12.

Processing continues at decision operation 1202, where the frame level QP is compared to an upper threshold (TH1). The upper threshold may be any upper threshold discussed herein such as 75-80% of a maximum allowable QP provided by a codec standard, 80-85% of the maximum allowable QP, 85-90% of the maximum allowable QP, or 75-90% of the maximum allowable QP. In response to the frame level QP exceeding the upper threshold (or meeting the upper threshold in some embodiments), processing continues at operation 1203, where wavefront split processing is disabled for the current frame. For example, as discussed with respect to FIG. 5, wavefronts may be applied and used for parallel processing blocks within the frame but without use of a wavefront split.

In response to the frame level QP not exceeding the upper threshold, processing continues at decision operation 1204, where the frame level QP is compared to a lower threshold (TH2). The lower threshold may be any lower threshold discussed herein such as 40-45% of the maximum allowable QP, 45-50% of the maximum allowable QP, 50-55% of the maximum allowable QP, or 40-55% of the maximum allowable QP. In response to the frame level QP being less than the lower threshold (or matching the lower threshold in some embodiments), processing continues at operation 1205, where a wavefront split is applied such that maximum block parallel processing is achieved. In contexts where a single wavefront split is applied, the wavefront is applied at a mid-frame diagonal of the video frame. In contexts where two wavefront splits are applied, the splits are applied such that the pre-first wavefront split region is about one-fourth of the video frame, the post-second wavefront split region is about one-fourth of the video frame, and the between wavefront split region is about one-half of the video frame.

In response to the frame level QP not being less than the lower threshold, processing continues at operation 1206, where wavefront split(s) are applied closer to the corner(s) of the video frame in response to increasing frame level QP. For example, as frame level QP increases, the wavefront split(s) are moved away from mid-frame and toward corner(s) or, similarly, toward mid-frame and away from the corner(s) with decreasing frame level QP, as discussed herein.

Figure 13:
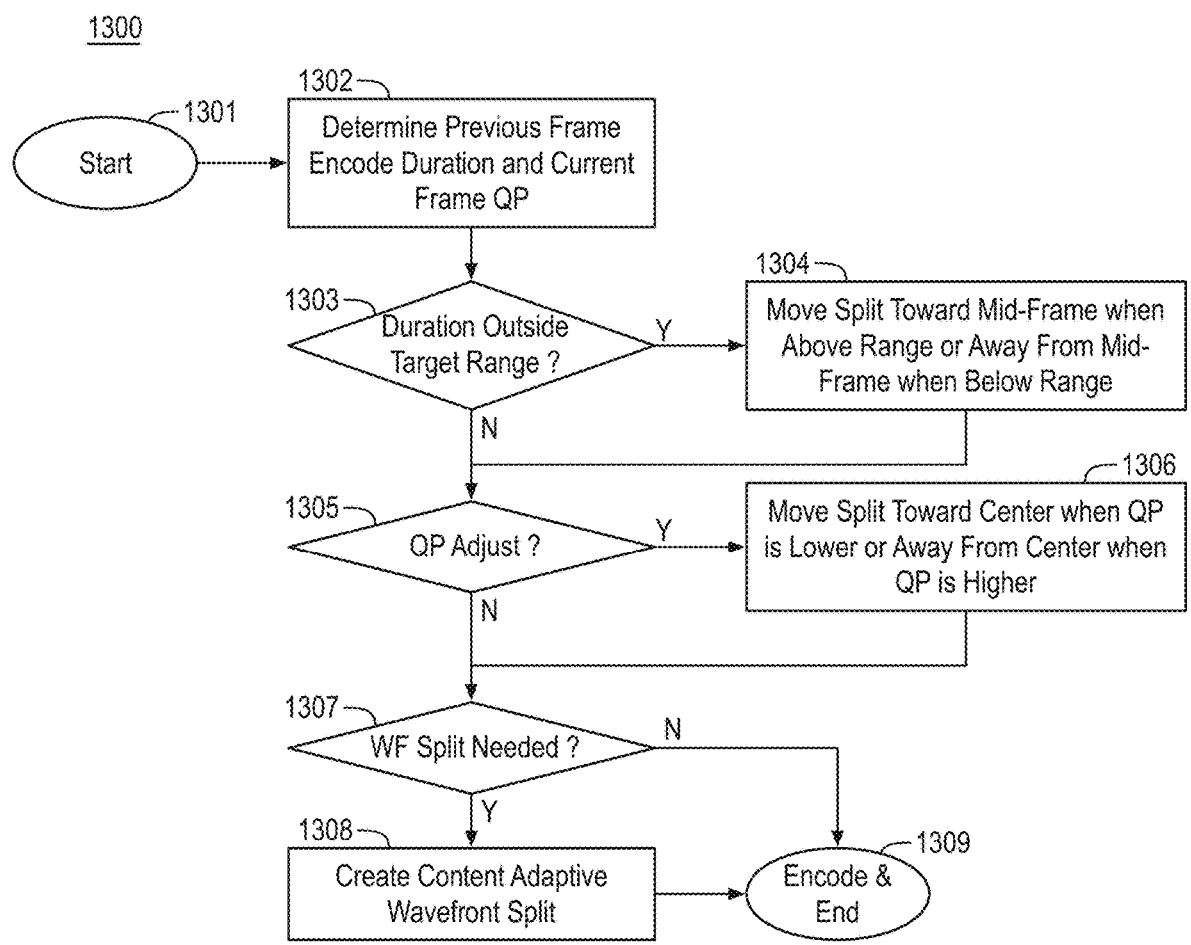
FIG. 13 illustrates an exemplary adaptive wavefront split process using previous frame encode duration and optional content based wavefront splits.

FIG. 13 illustrates an exemplary adaptive wavefront split process 1300 using previous frame encode duration and optional content based wavefront splits, arranged in accordance with at least some implementations of the present disclosure. Process 1300 may include one or more operations 1301-1309 as illustrated in FIG. 13. Process 1300 may be performed by a device (e.g., system 100 as discussed herein) to perform wavefront split processing.

Processing begins at start operation 1301, where encode processing for a video frame or multiple video frames begins. Processing continues at operation 1302, where a previous frame encode duration and a current frame QP are determined. The current frame QP may be determined using any techniques discussed herein. The previous frame may be any previous frame in an encode order such as an immediately encoded frame and the frame encode duration may be a measure of the time taken to encode the previous frame. Notably, a per frame encode duration target range may be set such as 14 to 15 ms for 60 frame per second video processing. Although discussed with respect to a single previous frame encode duration, averages of a number of previous frame encode durations (e.g., 3 frames), or other measures may be used.

Processing continues at decision operation 1303, where a determination is made as to whether the previous frame encode duration is outside of the range. For example, the previous frame encode duration may be compared to an upper duration threshold and a lower duration threshold and, if the previous frame encode duration exceeds the upper duration threshold or is less than the lower duration threshold, processing continues at operation 1304, where a wavefront split may be moved for the current frame in response to the previous frame encode duration being outside of the range.

For example, based on the current frame QP, a wavefront split location(s) may be generated as discussed herein. The wavefront split location may then be moved responsive to the previous frame encode duration being outside of the range. As shown, in response to the previous frame encode duration being above the range (e.g., the previous frame encode duration was unacceptably slow), the wavefront split location(s) are moved toward mid-frame (or center) of the current video frame. For example, when one wavefront split is used, the wavefront split is moved from the lower right corner toward the mid-frame diagonal. When two wavefront splits are used, the wavefront splits are moved from the corners toward the maximum parallelization positions as discussed herein. Also shown, in response to the previous frame encode duration being below the range (e.g., the previous frame encode duration was unacceptably fast), the wavefront split location(s) are moved away from mid-frame (or center) of the current video frame and toward corner(s) thereof. In some embodiments, processing may continue from operation 1304 at operation 1309 where encode is performed using the adapted wavefront split(s).

In other embodiments, processing continues from operation 1304 at decision operation 1305, where a determination is made as to whether a QP adjustment from the previous frame has been made. If so, processing continues at operation 1306, where the wavefront split may be moved in response to the QP adjustment. For example, when the current frame QP is lower than the previous frame QP, the wavefront split location(s) may be moved toward mid-frame (or center) of the current video frame and, when the current frame QP is higher than the previous frame QP, the wavefront split location(s) may be moved away from mid-frame (or center) of the current video frame and toward corner(s) thereof. In some embodiments, processing may continue from operation 1306 at operation 1309 where encode is performed using the adapted wavefront split(s).

In other embodiments, processing continues from operation 1306 at decision operation 1307, where a determination is made as to whether a wavefront split is needed. For example, the frame level QP for the current frame may be compared to upper and lower thresholds as discussed herein and, when frame level QP for the current frame exceeds the upper threshold, no wavefront split is applied and processing continues at operation 1309 where encode is performed using no adapted wavefront split (e.g., wavefront split is disabled). If a wavefront split is needed, processing may continue as discussed herein where a current frame wavefront split or splits are generated according to frame level QP. In other embodiments, processing continues at operation 1308, where a content adaptive wavefront split is generated.

Notably, in addition or in the alternative to being adaptive to frame level QP for performance needs, the adaptive wavefront split may be adaptive to content of a current video frame for both quality and performance. In some embodiments, prior to encoding, preprocessing on downsampled video frames may be performed to generate block or region based complexity measures for blocks or regions of a current video frame. In some embodiments, hierarchical motion estimation is employed to generate spatial and/or temporal complexity metrics for each block. As used herein, the term spatial complexity indicates a measure of the spatial content of a block such that uniform or flat blocks have low spatial complexity and non-uniform or highly texture blocks have high spatial complexity. For example, spatial complexity may be based on low resolution and limited intra prediction distortion, variance, or other measures. As used herein, the term temporal complexity indicates a measure of between frame changes in the video content (e.g., inter frame changes) such that uniform motion or low motion blocks have low temporal complexity and non-uniform or high motion blocks have high temporal complexity. For example, temporal complexity may be based on low resolution and limited motion estimation and compensation distortion measures for blocks of a frame as is performed in hierarchical motion estimation techniques.

In the context of a current frame encode, areas with higher spatial complexity are less likely to produce visual quality artifacts as with higher temporal complexity. Furthermore, content with higher spatial and/or temporal complexity typically take longer to encode with the same QP. Based on the discussed, spatial and/or complexity measures, the location of the wavefront split may be adjusted (size meaning how many blocks are within the wave front split area(s) as well as which side. For example, when a wavefront split is in a high complexity region, the wavefront is moved toward mid-frame and, when a wavefront split is in a low complexity region, the wavefront is not moved or moved away from mid-frame. Notably, when two wavefront splits are used, when the first wavefront split is in a high complexity region, it is moved toward mid-frame and, when the second wavefront split is in a low complexity region, it is not moved or moved away from mid-frame. Thereby, the two wavefront splits may be at different distances from mid-frame. For example, the pre-wavefront split side of the first wavefront split (e.g., wavefront split 915) and the post-wavefront split side of the second wavefront split (e.g., wavefront split 912) may be adaptively sized to balance throughput due to parallel processing and artifacts due to the wavefront split. Such high and low complexity regions may be generated by summing complexity measures for blocks in a region. For example, a complexity measure sum or complexity measure average for blocks on either side (e.g., all blocks adjacent to and one or two blocks away using Manhattan distance) of a wavefront may be used and when the sum or average exceeds a first threshold, the wavefront split may be moved toward mid-frame and, when the sum or average does not exceed the first threshold the wavefront split may remain un-moved. In some embodiments, a second threshold, less than the first, is employed such that when the sum or average is less than the second threshold, the wavefront split may be moved away from mid-frame.

In other embodiments, one or more wavefront splits are used that are more highly adaptive to video frame complexity content. For example, changes from high complexity (e.g., distortion) to low complexity (e.g., distortion) within a video frame may be detected as a boundary between low and high complexity portions and a wavefront split may be applied along the boundary. For example, where there is a transition between low and high complexity regions, the motion vector field naturally stops propagating for that content change and a block after the change may select a correct motion vector without merge candidates. In another embodiment, the motion vector field is analyzed and no wave front split is provided across object motion. For example, motion vectors motion vectors of similar direction and length are used to segment the frame into wavefront splits. In some embodiments, regions are generated based on similar motion vectors (e.g., similarities in direction and length of motion vectors) and a boundary is generated that separates the regions (e.g., each region has similar motion vectors but between regions there is a difference in one or both of the motion vector directions or lengths). Therefore, a wavefront split may be applied along such a detected change boundary with little or no defect penalty and with improved parallelization. That is, the chance of creating visual quality artifacts across the wavefront split may be reduced to near zero while allowing improved throughput performance due to parallel encode processing.

Figure 14:
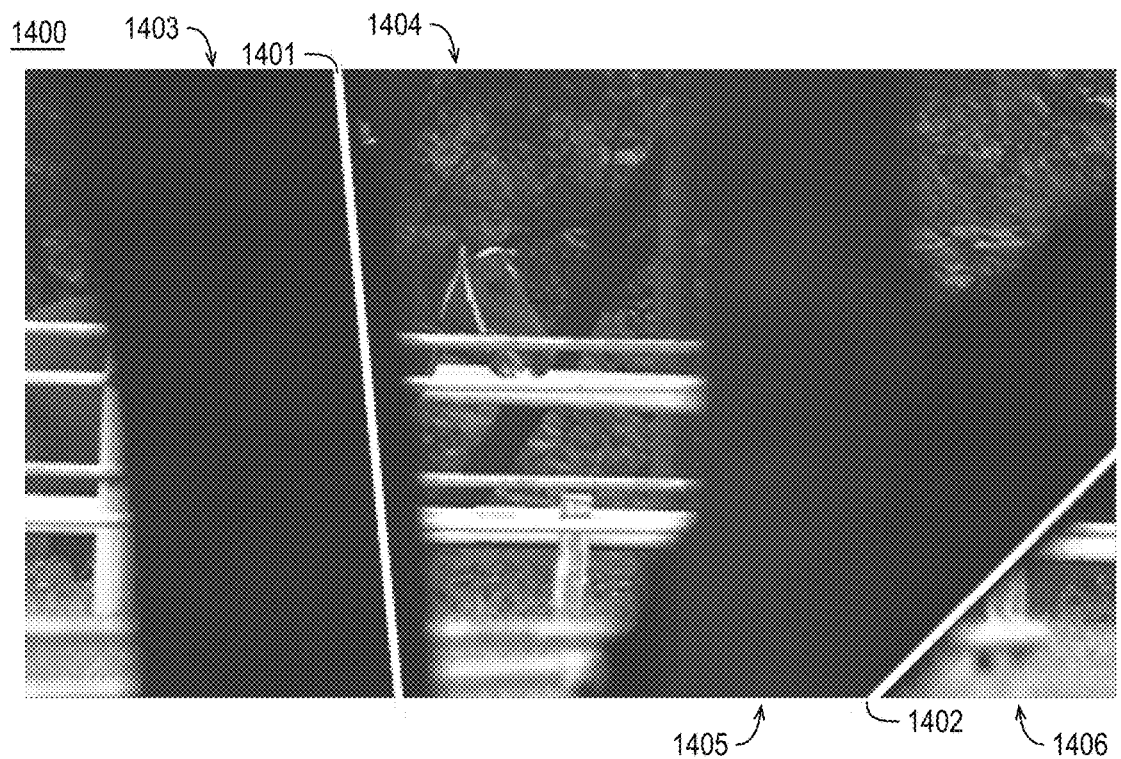
FIG. 14 illustrates exemplary content adaptive wavefront splits within an example video frame.
Figure 15:
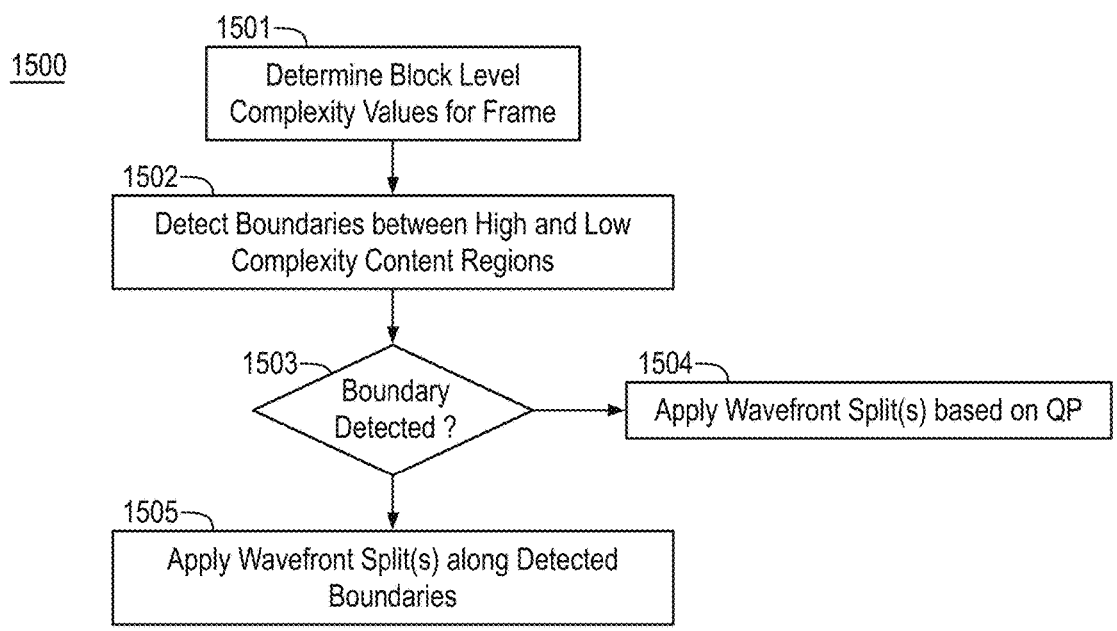
FIG. 15 illustrates an exemplary process for generation of content adaptive wavefront splits based on high and low complexity image content.

FIG. 14 illustrates exemplary content adaptive wavefront splits 1401, 1402 within an example video frame 1400, arranged in accordance with at least some implementations of the present disclosure. As shown in FIG. 14, wavefront splits 1401, 1402 are detected and implemented for parallel encode processing as discussed herein. Notably, the blocks of each separated region of video frame 1400 may be provided with a wavefront label and encode may be performed in parallel using such wavefront labels. In the example of FIG. 15, example wavefront splits are illustrated as straight lines for the sake of clarity of presentation. It is noted that such wavefronts, in practice, follow block boundaries and are therefore jagged lines.

In FIG. 14, wavefront splits 1401, 1402 are applied around image content boundaries that separate high and low complexity image content. In the context of FIG. 14, the camera may be panning for example such that the foreground trees have faster motion than the background (including a horse, fence, and additional background) and therefore provide occlusion of the background between frames. For example, in video frame 1400, wavefront split 1401 separates low complexity image content 1403 (which is relatively flat and likely to be well predicted by a previous frame) from high complexity image content 1404 (which has more detail and may not be well predicted due to being obscured in a prior frame). Similarly, wavefront split 1402 separates low complexity image content 1405 from high complexity image content 1406.

Based on detection of boundaries corresponding to wavefront splits 1401, 1402 that indicate separation of low and high complexity image content, wavefront splits 1401, 1402 are then applied during encode as discussed herein. Notably, wavefront splits 1401, 1402 allows good performance gains due to parallel block processing while the spatial break caused by wavefront splits 1401, 1402 does not cause a break across a continual motion field (e.g., the motion field was broken by the separation of low and high complexity image content.

FIG. 15 illustrates an exemplary process 1500 for generation of content adaptive wavefront splits based on high and low complexity image content, arranged in accordance with at least some implementations of the present disclosure. Process 1500 may include one or more operations 1501-1505 as illustrated in FIG. 15. Process 1500 may be performed by a device (e.g., system 100 as discussed herein) to perform adaptive wavefront split generation.

Processing begins at start operation 1501, where block level complexity values are determined for blocks of a video frame. The block level complexity values may include temporal complexity values or spatial complexity values or a combination thereof (e.g., an average of spatial and temporal complexity values). As discussed, temporal complexity values may be based on low resolution and limited motion estimation and compensation distortion (e.g., distortion from downsampled motion estimation and compensation) and spatial complexity may be based on low resolution and limited intra prediction distortion. In an embodiment, both temporal and spatial complexity values are used. In an embodiment, lower of the temporal and spatial complexity values for each block are used. In an embodiment, the temporal and spatial complexity values for each block are averaged.

Processing continues at operation 1502, where boundaries between high and low complexity regions of the video frame are detected based on the block level complexity values. The high and low complexity region boundaries may be detected using any suitable technique or techniques. In some embodiments, a maximum complexity difference between any two blocks is first detected. Then, based the maximum complexity difference border between the two blocks having the maximum complexity difference, a boundary may be generated by testing different candidate boundaries extending through the maximum complexity difference border. The boundary having the maximum block-by-block (e.g., summed) complexity difference across the boundary may then be selected as a boundary. In some embodiments, only the maximum complexity difference border is used. In some embodiments, two or more maximum complexity difference borders are employed.

Although illustrated with respect to boundary detection using high and low complexity regions, other techniques may be used. In some embodiments, a motion vector field for the video frame (e.g., a motion vector field generated using downsampled frames) is analyzed to generate the boundary. For example, the blocks of the video frame may be grouped based on similarities between block motion vectors. For example, if the motion vectors differ by a threshold in both the x- and y-dimensions, blocks may be grouped together into regions. A separation between the regions may then be established and the boundary therebetween may be used.

Processing continues at decision operation 1503, where a determination is made as to whether any boundaries are detected. In some embodiments, such a determination may be made in conjunction with operation 1502. For example, the maximum complexity difference may be compared to a threshold and, if it does not exceed a threshold (e.g., no between block complexity difference exceeds a threshold), no boundary is deemed to be detected. In some embodiments, the determination is made based on an average complexity difference across the boundary. For example, when the average complexity difference across the boundary exceeds a threshold, a boundary is detected and, when the average complexity difference across the boundary does not exceed the threshold, no boundary is detected. Other constraints may also be provided for the boundary such as a length of the boundary (e.g., Manhattan distance) needing to exceed a threshold (e.g., 10 block distances where a block distance is a block height or width, which are equal and may be 64 pixels for example).

If no boundary is detected, processing continues at operation 1504, where one or more wavefront splits are applied based on frame level QP as discussed herein. If one or more boundaries are detected, processing continues at operation 1505, where wavefront split(s) are applied during encode in response to the detected boundaries. In some embodiments, the wavefront split(s) are provided at the same location(s) as the detected boundary or boundaries.

Figure 16:
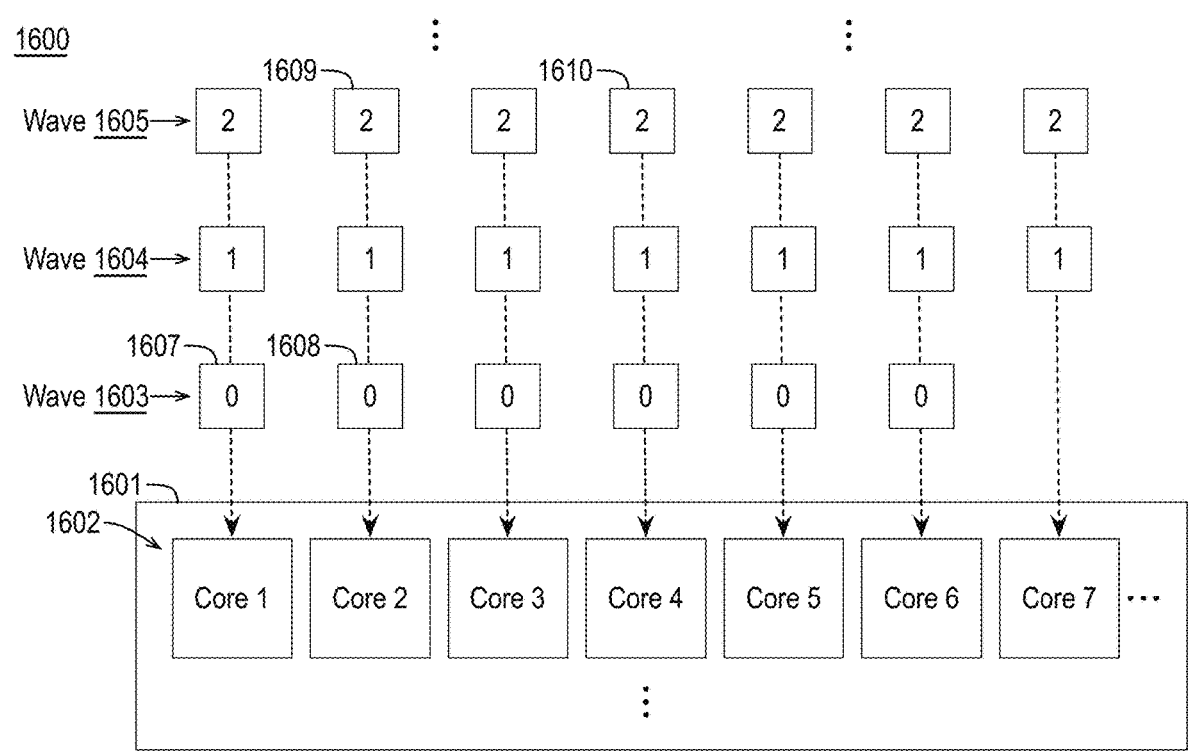
FIG. 16 illustrates exemplary parallel block coding.

FIG. 16 illustrates exemplary parallel block coding 1600, arranged in accordance with at least some implementations of the present disclosure. For example, parallel block coding 1600 may perform block coding mode selection and or block encode in parallel. As shown, parallel block coding 1600 may be implemented by a multicore processor 1601 including any number of processor cores 1602. Multicore processor 1601 may include any number of processor cores 1602 and may implement any instruction set architecture. In some embodiments, multicore processor 1601 is a CPU with multiple cores. In an embodiment, multicore processor 1601 is a GPU with multiple cores. In an embodiment, multicore processor 1601 is implemented via a monolithic integrated circuit. In an embodiment, multicore processor 1601 is implemented via a monolithic field programmable gate array integrated circuit. As used herein, the term monolithic indicates a device that is discrete from other devices, although it may be coupled to other devices for communication and power supply.

As shown, each of waves of blocks including waves of blocks 1603, 1604, 1605 are processed in parallel such that each block of a wave is processed separately and at least partially in parallel by one of processor cores 1602. For example, block 1607 and block 1608 of wave of blocks 1603 are processed at least partially in parallel by core 1 and core 2, respectively of processor cores 1602 of multicore processor 1601. Similarly, block 1609 and block 1610 of wave of blocks 1605 are processed at least partially in parallel by core 2 and core 4, respectively of processor cores 1602 of multicore processor 1601, and so on. Such parallel processing may continue for all wavefronts of video frame 401 for example.

Figure 17:
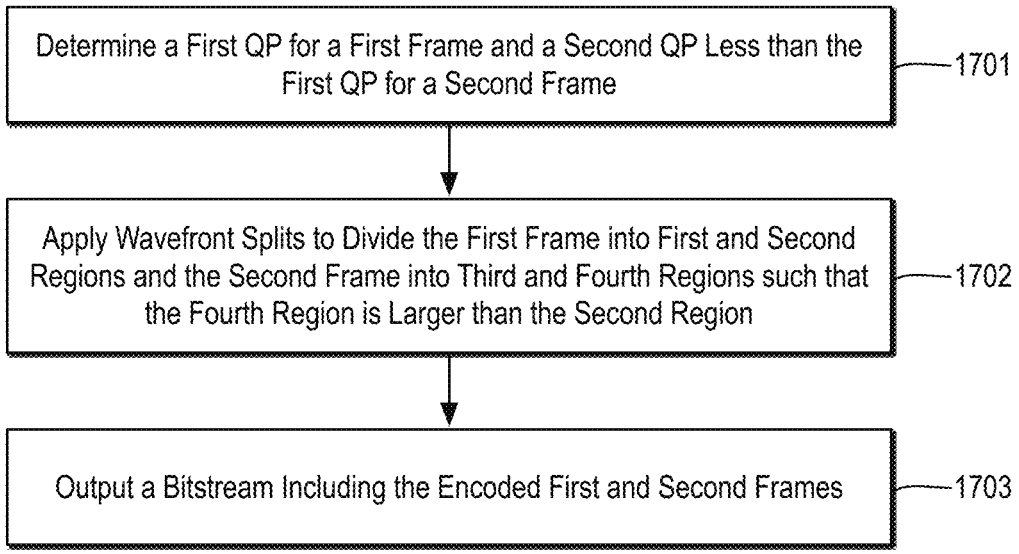
FIG. 17 is a flow diagram illustrating an example process for video coding.

FIG. 17 is a flow diagram illustrating an example process 1700 for video coding, arranged in accordance with at least some implementations of the present disclosure. Process 1700 may include one or more operations 1701-1703 as illustrated in FIG. 17. Process 1700 may form at least part of a video coding process. By way of non-limiting example, process 1700 may form at least part of a video coding process as performed by any device or system as discussed herein such as system 100. Furthermore, process 1700 will be described herein with reference to system 1800 of FIG. 18.

Figure 18:
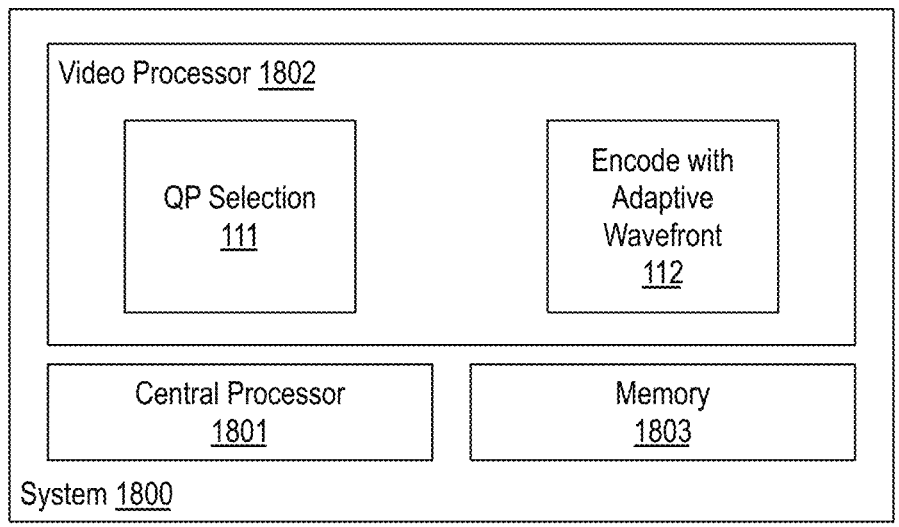
FIG. 18 is an illustrative diagram of an example system for video coding.

FIG. 18 is an illustrative diagram of an example system 1800 for video coding, arranged in accordance with at least some implementations of the present disclosure. As shown in FIG. 18, system 1800 may include a central processor 1801, a video processor 1802, and a memory 1803. Also as shown, video processor 1802 may include or implement QP selection module 111 and encode module 112. For example, system 1800 may implement one or more processors to implement the techniques discussed herein. In the example of system 1800, memory 1803 may store video data or related content such as frame data, block data, block coding mode decision data, wavefront data, bitstream data, and/or any other data as discussed herein.

As shown, in some embodiments, QP selection module 111 and encode module 112 are implemented via video processor 1802. In other embodiments, one or more or portions of QP selection module 111 and encode module 112 are implemented via central processor 1801 or another processing unit such as an image processor, a graphics processor, or the like. Video processor 1802 may include any number and type of video, image, or graphics processing units that may provide the operations as discussed herein. Such operations may be implemented via software or hardware or a combination thereof. For example, video processor 1802 may include circuitry dedicated to manipulate frames, frame data, or the like obtained from memory 1803. Central processor 1801 may include any number and type of processing units or modules that may provide control and other high level functions for system 1800 and/or provide any operations as discussed herein. Memory 1803 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1803 may be implemented by cache memory.

In an embodiment, one or more or portions of QP selection module 111 and encode module 112 are implemented via an execution unit (EU). The EU may include, for example, programmable logic or circuitry such as a logic core or cores that may provide a wide array of programmable logic functions. In an embodiment, one or more or portions of QP selection module 111 and encode module 112 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 17, process 1700 begins at operation 1701, where a first frame level QP is determined for a first frame of video and a second frame level QP is determined for a second frame of the video such that the second frame level QP is less than the first frame level QP. The frame level QPs may be generated using any suitable technique or techniques discussed herein.

Processing continues at operation 1702, where, during encode of the first and second frames, a first wavefront split is applied to divide the first frame into first and second regions for parallel encode and a second wavefront split is applied to divide the second frame into third and fourth regions for parallel encode, respectively, such that the fourth region is larger than the second region in response to the second frame level QP being less than the first frame level QP. In some embodiments, the first and second regions are first pre- and post-wavefront split regions of the first video frame and the third and fourth regions are second pre- and post-wavefront split regions of the second video frame. In some embodiments, process 1700 further includes disabling, during encode of a third frame of the video, application of wavefront splitting to the third frame in response to a third frame level QP of the third frame being greater than a threshold QP. In some embodiments, the third and fourth regions have the same size in response to the second frame level QP being less than a threshold QP.

In some embodiments, process 1700 further includes applying, during the encode of the first and second frames, a third wavefront split to further divide the first region into fifth and sixth regions for parallel encode and a fourth wavefront split to further divide the third region into seventh and eighth regions for parallel encode such that the seventh region is larger than the fifth region in response to the second frame level QP being less than the first frame level QP. In some embodiments, the sixth region is between the fifth and second regions and the eighth region is between the seventh and fourth regions. In some embodiments, an area of the eighth region is within two percent of a sum of areas of the seventh and fourth regions in response to the second frame level QP being less than a threshold QP.

In some embodiments, process 1700 further includes determining a duration of the encode of the first frame is outside of a range between a lower frame encode duration threshold and an upper frame encode duration threshold and applying, during encode of a third frame subsequent to the second frame, a third wavefront split to divide the third frame into fifth and sixth regions for parallel encode, such that the sixth region is larger than the second region in response to the duration being greater than the upper frame encode duration threshold or smaller than the second region in response to the duration being less than the lower frame encode duration threshold.

In some embodiments, process 1700 further includes detecting, in a third frame, a boundary between a low complexity content region and a high complexity content region and applying, during encode of the third frame, a third wavefront split along the detected boundary to divide the third frame into fifth and sixth regions for parallel encode. In some embodiments, the boundary is detected based on comparisons of complexity measures between neighboring blocks of the third frame. In some embodiments, process 1700 further includes performing between block comparisons of complexity measures of neighboring blocks of the first frame to determine all neighboring block complexity measurement differences of the first frame are less than a threshold such that the first wavefront split is applied responsive to all neighboring block complexity measurement differences being less than the threshold.

Processing continues at operation 1703, where a bitstream including the encoded first and second frames is output. The bitstream may be any suitable bitstream such as a standards compliant bitstream. In some embodiments, the bitstream is an HEVC compliant bitstream.

Process 1700 may be repeated any number of times either in series or in parallel for any number of video frames, videos, pieces of video content. video segments, or the like.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 19:
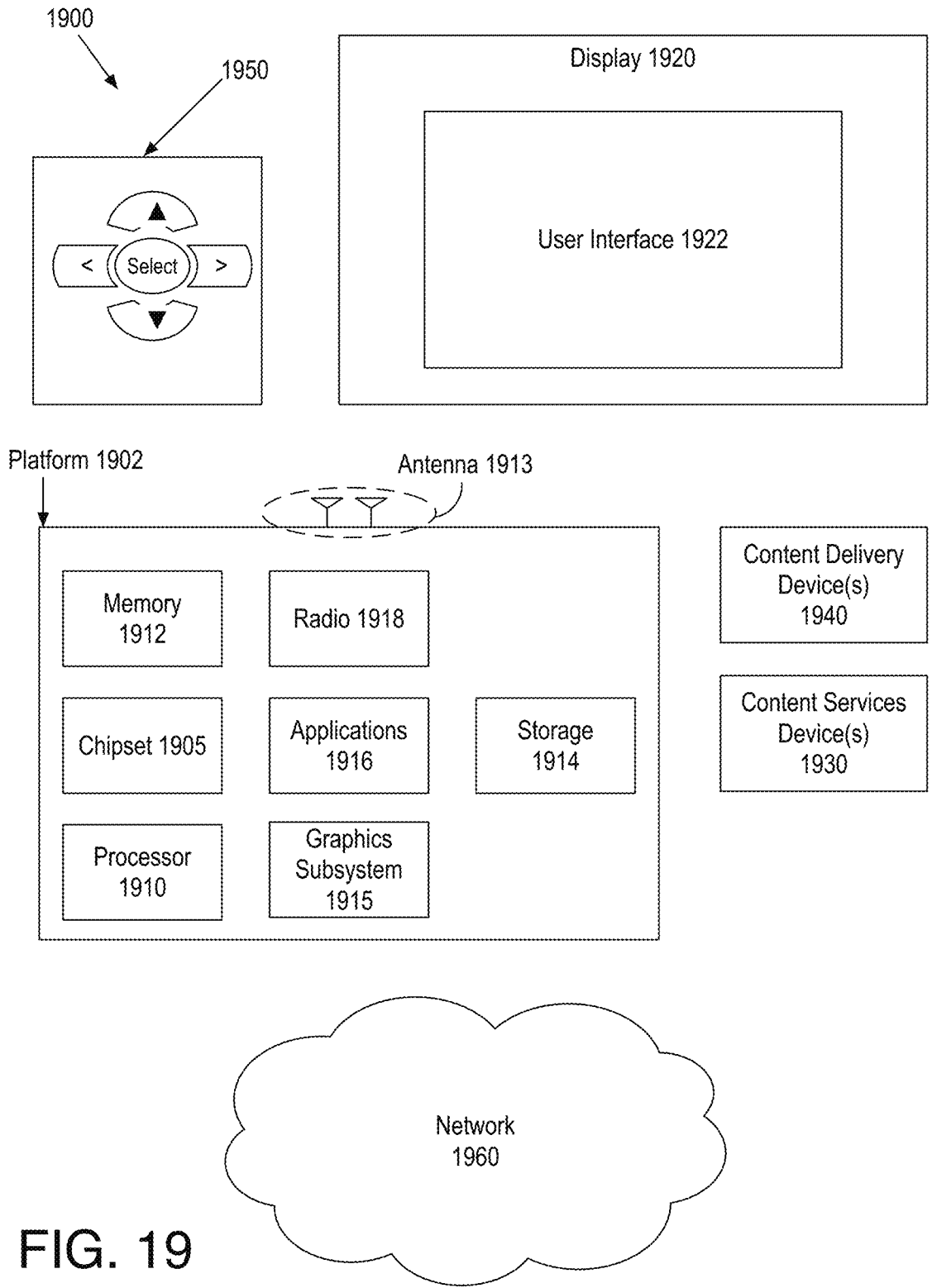
FIG. 19 is an illustrative diagram of an example system.

FIG. 19 is an illustrative diagram of an example system 1900, arranged in accordance with at least some implementations of the present disclosure. In various implementations, system 1900 may be a mobile system although system 1900 is not limited to this context. For example, system 1900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1900 includes a platform 1902 coupled to a display 1920. Platform 1902 may receive content from a content device such as content services device(s) 1930 or content delivery device(s) 1940 or other similar content sources. A navigation controller 1950 including one or more navigation features may be used to interact with, for example, platform 1902 and/or display 1920. Each of these components is described in greater detail below.

In various implementations, platform 1902 may include any combination of a chipset 1905, processor 1910, memory 1912, antenna 1913, storage 1914, graphics subsystem 1915, applications 1916 and/or radio 1918. Chipset 1905 may provide intercommunication among processor 1910, memory 1912, storage 1914, graphics subsystem 1915, applications 1916 and/or radio 1918. For example, chipset 1905 may include a storage adapter (not depicted) capable of providing intercommunication with storage 1914.

Processor 1910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1910 may be dual-core processor(s), dual-core mobile processor(s), and so forth.

Memory 1912 may be implemented as a volatile memory device such as, but not limited to, a Random Access Memory (RAM), Dynamic Random Access Memory (DRAM), or Static RAM (SRAM).

Storage 1914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1914 may include technology to increase the storage performance enhanced protection for valuable digital media when multiple hard drives are included, for example.

Graphics subsystem 1915 may perform processing of images such as still or video for display. Graphics subsystem 1915 may be a graphics processing unit (GPU) or a visual processing unit (VPU), for example. An analog or digital interface may be used to communicatively couple graphics subsystem 1915 and display 1920. For example, the interface may be any of a High-Definition Multimedia Interface, DisplayPort, wireless HDMI, and/or wireless HD compliant techniques. Graphics subsystem 1915 may be integrated into processor 1910 or chipset 1905. In some implementations, graphics subsystem 1915 may be a stand-alone device communicatively coupled to chipset 1905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1918 may operate in accordance with one or more applicable standards in any version.

In various implementations, display 1920 may include any television type monitor or display. Display 1920 may include, for example, a computer display screen, touch screen display, video monitor, television-like device, and/or a television. Display 1920 may be digital and/or analog. In various implementations, display 1920 may be a holographic display. Also, display 1920 may be a transparent surface that may receive a visual projection. Such projections may convey various forms of information, images, and/or objects. For example, such projections may be a visual overlay for a mobile augmented reality (MAR) application. Under the control of one or more software applications 1916, platform 1902 may display user interface 1922 on display 1920.

In various implementations, content services device(s) 1930 may be hosted by any national, international and/or independent service and thus accessible to platform 1902 via the Internet, for example. Content services device(s) 1930 may be coupled to platform 1902 and/or to display 1920. Platform 1902 and/or content services device(s) 1930 may be coupled to a network 1960 to communicate (e.g., send and/or receive) media information to and from network 1960. Content delivery device(s) 1940 also may be coupled to platform 1902 and/or to display 1920.

In various implementations, content services device(s) 1930 may include a cable television box, personal computer, network, telephone, Internet enabled devices or appliance capable of delivering digital information and/or content, and any other similar device capable of uni-directionally or bi-directionally communicating content between content providers and platform 1902 and/display 1920, via network 1960 or directly. It will be appreciated that the content may be communicated uni-directionally and/or bi-directionally to and from any one of the components in system 1900 and a content provider via network 1960. Examples of content may include any media information including, for example, video, music, medical and gaming information, and so forth.

Content services device(s) 1930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1902 may receive control signals from navigation controller 1950 having one or more navigation features. The navigation features of may be used to interact with user interface 1922, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features may be replicated on a display (e.g., display 1920) by movements of a pointer, cursor, focus ring, or other visual indicators displayed on the display. For example, under the control of software applications 1916, the navigation features located on navigation may be mapped to virtual navigation features displayed on user interface 1922, for example. In various embodiments, may not be a separate component but may be integrated into platform 1902 and/or display 1920. The present disclosure, however, is not limited to the elements or in the context shown or described herein.

In various implementations, drivers (not shown) may include technology to enable users to instantly turn on and off platform 1902 like a television with the touch of a button after initial boot-up, when enabled, for example. Program logic may allow platform 1902 to stream content to media adaptors or other content services device(s) 1930 or content delivery device(s) 1940 even when the platform is turned "off." In addition, chipset 1905 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1900 may be integrated. For example, platform 1902 and content services device(s) 1930 may be integrated, or platform 1902 and content delivery device(s) 1940 may be integrated, or platform 1902, content services device(s) 1930, and content delivery device(s) 1940 may be integrated, for example. In various embodiments, platform 1902 and display 1920 may be an integrated unit. Display 1920 and content service device(s) 1930 may be integrated, or display 1920 and content delivery device(s) 1940 may be integrated, for example. These examples are not meant to limit the present disclosure.

In various embodiments, system 1900 may be implemented as a wireless system, a wired system, or a combination of both. When implemented as a wireless system, system 1900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 19.

Figure 20:
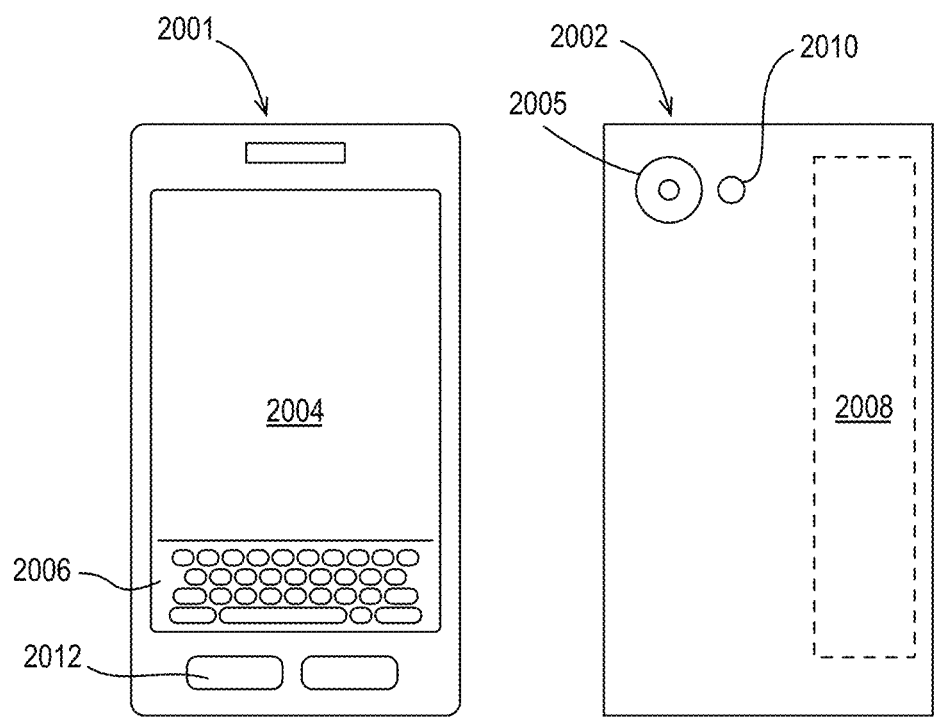
FIG. 20 illustrates an example device, all arranged in accordance with at least some implementations of the present disclosure.

As described above, system 1900 may be embodied in varying physical styles or form factors. FIG. 20 illustrates an example small form factor device 2000, arranged in accordance with at least some implementations of the present disclosure. In some examples, system 1900 may be implemented via device 2000. In other examples, system 100 or portions thereof may be implemented via device 2000. In various embodiments, for example, device 2000 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 20, device 2000 may include a housing with a front 2001 and a back 2002. Device 2000 includes a display 2004, an input/output (I/O) device 2006, and an integrated antenna 2008. Device 2000 also may include navigation features 2012. I/O device 2006 may include any suitable I/O device for entering information into a mobile computing device. Examples for I/O device 2006 may include an alphanumeric keyboard, a numeric keypad, a touch pad, input keys, buttons, switches, microphones, speakers, voice recognition device and software, and so forth. Information also may be entered into device 2000 by way of microphone (not shown), or may be digitized by a voice recognition device. As shown, device 2000 may include a camera 2005 (e.g., including a lens, an aperture, and an imaging sensor) and a flash 2010 integrated into back 2002 (or elsewhere) of device 2000. In other examples, camera 2005 and flash 2010 may be integrated into front 2001 of device 2000 or both front and back cameras may be provided. Camera 2005 and flash 2010 may be components of a camera module to originate image data processed into streaming video that is output to display 2004 and/or communicated remotely from device 2000 via antenna 2008 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for video coding comprises determining a first frame level quantization parameter (QP) for a first frame of video and a second frame level QP for a second frame of the video, wherein the second frame level QP is less than the first frame level QP, applying, during encode of the first and second frames, a first wavefront split to divide the first frame into first and second regions for parallel encode and a second wavefront split to divide the second frame into third and fourth regions for parallel encode, respectively, wherein the fourth region is larger than the second region in response to the second frame level QP being less than the first frame level QP, and outputting a bitstream comprising the encoded first and second frames.

In one or more second embodiments, further to the first embodiment, the first and second regions are first pre- and post-wavefront split regions of the first video frame and the third and fourth regions are second pre- and post-wavefront split regions of the second video frame.

In one or more third embodiments, further to the first or second embodiments, the method further comprises applying, during the encode of the first and second frames, a third wavefront split to further divide the first region into fifth and sixth regions for parallel encode and a fourth wavefront split to further divide the third region into seventh and eighth regions for parallel encode, wherein the seventh region is larger than the fifth region in response to the second frame level QP being less than the first frame level QP.

In one or more fourth embodiments, further to any of the first through third embodiments, the sixth region is between the fifth and second regions and the eighth region is between the seventh and fourth regions.

In one or more fifth embodiments, further to any of the first through fourth embodiments, an area of the eighth region is within two percent of a sum of areas of the seventh and fourth regions in response to the second frame level QP being less than a threshold QP.

In one or more sixth embodiments, further to any of the first through fifth embodiments, the method further comprises disabling, during encode of a third frame of the video, application of wavefront splitting to the third frame in response to a third frame level QP of the third frame being greater than a threshold QP.

In one or more seventh embodiments, further to any of the first through sixth embodiments, the third and fourth regions have the same size in response to the second frame level QP being less than a threshold QP.

In one or more eighth embodiments, further to any of the first through seventh embodiments, the method further comprises determining a duration of the encode of the first frame is outside of a range between a lower frame encode duration threshold and an upper frame encode duration threshold and applying, during encode of a third frame subsequent to the second frame, a third wavefront split to divide the third frame into fifth and sixth regions for parallel encode, wherein the sixth region is larger than the second region in response to the duration being greater than the upper frame encode duration threshold or smaller than the second region in response to the duration being less than the lower frame encode duration threshold.

In one or more ninth embodiments, further to any of the first through eighth embodiments, the method further comprises detecting, in a third frame, a boundary between a low complexity content region and a high complexity content region and applying, during encode of the third frame, a third wavefront split along the detected boundary to divide the third frame into fifth and sixth regions for parallel encode.

In one or more tenth embodiments, further to any of the first through ninth embodiments, the boundary is detected based on comparisons of complexity measures between neighboring blocks of the third frame.

In one or more eleventh embodiments, further to any of the first through tenth embodiments, the method further comprises performing between block comparisons of complexity measures of neighboring blocks of the first frame to determine all neighboring block complexity measurement differences of the first frame are less than a threshold, wherein the first wavefront split is applied responsive to all neighboring block complexity measurement differences being less than the threshold.

In one or more twelfth embodiments, a device or system includes a memory and a processor to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A device for video coding comprising:
a memory to store video; and
one or more processors coupled to the memory, the one or more processors to:
determine a first frame level quantization parameter (QP) for a first frame of the video and a second frame level QP for a second frame of the video, wherein the second frame level QP is less than the first frame level QP;
apply, during encode of the first and second frames, a first wavefront split to divide the first frame into first and second regions for parallel encode and a second wavefront split to divide the second frame into third and fourth regions for parallel encode, respectively, wherein the fourth region is larger than the second region in response to the second frame level QP being less than the first frame level QP; and
output a bitstream comprising the encoded first and second frames.

2. The device of claim 1, wherein the first and second regions are first pre- and post-wavefront split regions of the first frame and the third and fourth regions are second pre- and post-wavefront split regions of the second frame.

3. The device of claim 1, the one or more processors to:
apply, during the encode of the first and second frames, a third wavefront split to further divide the first region into fifth and sixth regions for parallel encode and a fourth wavefront split to further divide the third region into seventh and eighth regions for parallel encode, wherein the seventh region is larger than the fifth region in response to the second frame level QP being less than the first frame level QP.

4. The device of claim 3, wherein the sixth region is between the fifth and second regions and the eighth region is between the seventh and fourth regions.

5. The device of claim 3, wherein an area of the eighth region is within two percent of a sum of areas of the seventh and fourth regions in response to the second frame level QP being less than a threshold QP.

6. The device of claim 1, the one or more processors to:
disable, during encode of a third frame of the video, application of wavefront splitting to the third frame in response to a third frame level QP of the third frame being greater than a threshold QP.

7. The device of claim 1, wherein the third and fourth regions have the same size in response to the second frame level QP being less than a threshold QP.

8. The device of claim 1, the one or more processors to:
determine a duration of the encode of the first frame is outside of a range between a lower frame encode duration threshold and an upper frame encode duration threshold; and
apply, during encode of a third frame subsequent to the second frame, a third wavefront split to divide the third frame into fifth and sixth regions for parallel encode, wherein the sixth region is larger than the second region in response to the duration being greater than the upper frame encode duration threshold or smaller than the second region in response to the duration being less than the lower frame encode duration threshold.

9. The device of claim 1, the one or more processors to:
detect, in a third frame, a boundary between a low complexity content region and a high complexity content region; and
apply, during encode of the third frame, a third wavefront split along the detected boundary to divide the third frame into fifth and sixth regions for parallel encode.

10. The device of claim 9, wherein the boundary is detected based on comparisons of complexity measures between neighboring blocks of the third frame.

11. The device of claim 1, the one or more processors to:
perform between block comparisons of complexity measures of neighboring blocks of the first frame to determine all neighboring block complexity measurement differences of the first frame are less than a threshold, wherein the first wavefront split is applied responsive to all neighboring block complexity measurement differences being less than the threshold.

12. A method for video coding, comprising:
determining a first frame level quantization parameter (QP) for a first frame of video and a second frame level QP for a second frame of the video, wherein the second frame level QP is less than the first frame level QP;
applying, during encode of the first and second frames, a first wavefront split to divide the first frame into first and second regions for parallel encode and a second wavefront split to divide the second frame into third and fourth regions for parallel encode, respectively, wherein the fourth region is larger than the second region in response to the second frame level QP being less than the first frame level QP; and
outputting a bitstream comprising the encoded first and second frames.

13. The method of claim 12, further comprising:
applying, during the encode of the first and second frames, a third wavefront split to further divide the first region into fifth and sixth regions for parallel encode and a fourth wavefront split to further divide the third region into seventh and eighth regions for parallel encode, wherein the seventh region is larger than the fifth region in response to the second frame level QP being less than the first frame level QP.

14. The method of claim 12, further comprising:
disabling, during encode of a third frame of the video, application of wavefront splitting to the third frame in response to a third frame level QP of the third frame being greater than a threshold QP.

15. The method of claim 12, further comprising:
determining a duration of the encode of the first frame is outside of a range between a lower frame encode duration threshold and an upper frame encode duration threshold; and
applying, during encode of a third frame subsequent to the second frame, a third wavefront split to divide the third frame into fifth and sixth regions for parallel encode, wherein the sixth region is larger than the second region in response to the duration being greater than the upper frame encode duration threshold or smaller than the second region in response to the duration being less than the lower frame encode duration threshold.

16. The method of claim 12, further comprising:
detecting, in a third frame, a boundary between a low complexity content region and a high complexity content region; and
applying, during encode of the third frame, a third wavefront split along the detected boundary to divide the third frame into fifth and sixth regions for parallel encode.

17. At least one non-transitory machine readable medium comprising a plurality of instructions that, in response to being executed on a computing device, cause the computing device to code video by:
determining a first frame level quantization parameter (QP) for a first frame of video and a second frame level QP for a second frame of the video, wherein the second frame level QP is less than the first frame level QP;
applying, during encode of the first and second frames, a first wavefront split to divide the first frame into first and second regions for parallel encode and a second wavefront split to divide the second frame into third and fourth regions for parallel encode, respectively, wherein the fourth region is larger than the second region in response to the second frame level QP being less than the first frame level QP; and
outputting a bitstream comprising the encoded first and second frames.

18. The non-transitory machine readable medium of claim 17, further comprising instructions that, in response to being executed on the computing device, cause the computing device to code video by:
applying, during the encode of the first and second frames, a third wavefront split to further divide the first region into fifth and sixth regions for parallel encode and a fourth wavefront split to further divide the third region into seventh and eighth regions for parallel encode, wherein the seventh region is larger than the fifth region in response to the second frame level QP being less than the first frame level QP.

19. The non-transitory machine readable medium of claim 17, further comprising instructions that, in response to being executed on the computing device, cause the computing device to code video by:
disabling, during encode of a third frame of the video, application of wavefront splitting to the third frame in response to a third frame level QP of the third frame being greater than a threshold QP.

20. The non-transitory machine readable medium of claim 17, further comprising instructions that, in response to being executed on the computing device, cause the computing device to code video by:
determining a duration of the encode of the first frame is outside of a range between a lower frame encode duration threshold and an upper frame encode duration threshold; and
applying, during encode of a third frame subsequent to the second frame, a third wavefront split to divide the third frame into fifth and sixth regions for parallel encode, wherein the sixth region is larger than the second region in response to the duration being greater than the upper frame encode duration threshold or smaller than the second region in response to the duration being less than the lower frame encode duration threshold.

21. The non-transitory machine readable medium of claim 17, further comprising instructions that, in response to being executed on the computing device, cause the computing device to code video by:
detecting, in a third frame, a boundary between a low complexity content region and a high complexity content region; and
applying, during encode of the third frame, a third wavefront split along the detected boundary to divide the third frame into fifth and sixth regions for parallel encode.

* * * * *